United States Patent
Lee et al.

(10) Patent No.: US 10,194,478 B2
(45) Date of Patent: Jan. 29, 2019

(54) METHOD AND APPARATUS FOR PERFORMING WIRELESS DOCKING SERVICE

(71) Applicant: LG ELECTRONICS INC., Seoul (KR)

(72) Inventors: Jaeho Lee, Seoul (KR); Dongcheol Kim, Seoul (KR); Hyeonjae Lee, Seoul (KR); Jinpil Kim, Seoul (KR); Byungjoo Lee, Seoul (KR); Koh Choi, Seoul (KR); Inhwan Choi, Seoul (KR); Minsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 154 days.

(21) Appl. No.: 14/888,215

(22) PCT Filed: Apr. 29, 2014

(86) PCT No.: PCT/KR2014/003744
§ 371 (c)(1),
(2) Date: Oct. 30, 2015

(87) PCT Pub. No.: WO2014/178592
PCT Pub. Date: Nov. 6, 2014

(65) Prior Publication Data
US 2016/0081132 A1    Mar. 17, 2016

Related U.S. Application Data

(60) Provisional application No. 61/818,405, filed on May 1, 2013, provisional application No. 61/945,096, filed on Feb. 26, 2014.

(51) Int. Cl.
H04M 1/725    (2006.01)
H04W 40/24    (2009.01)
(Continued)

(52) U.S. Cl.
CPC ......... *H04W 76/15* (2018.02); *H04M 1/7253* (2013.01); *H04W 40/246* (2013.01);
(Continued)

(58) Field of Classification Search
None
See application file for complete search history.

(56) References Cited

U.S. PATENT DOCUMENTS 6,072,468 A    6/2000    Hocker et al.
8,254,992 B1   8/2012    Ashenbrenner et al.
(Continued)

FOREIGN PATENT DOCUMENTS

JP    2006-229360 A      8/2006
KR    10-2011-0140129 A  12/2011
(Continued)

OTHER PUBLICATIONS

Office Action dated Mar. 8, 2016, issued by the Australian Patent Office in Australian Patent Application No. 2014260672.
(Continued)

*Primary Examiner* — Charles C Jiang
*Assistant Examiner* — Saad Khawar
(74) *Attorney, Agent, or Firm* — Morgan, Lewis & Bockius LLP

(57) ABSTRACT

A method for performing a docking service using Wi-Fi by a wireless dockee (WD), includes transmitting a probe request including a docking information element (IE) 1 for discovering to docking service to a wireless docking center (WDC); receiving a probe response including a docking IE 2 from the wireless docking center (WDC) which has received the probe request; and performing a docking connection with the wireless docking center (WDC) based on the received probe response, wherein the docking IE 1 includes at least one of a device name parameter indicating (Continued)

a name of a device, a device Identifier parameter for identifying a device, or a docking information request parameter indicating a command of a docking service discovery.

12 Claims, 33 Drawing Sheets

(51) Int. Cl.
*H04W 48/14* (2009.01)
*H04W 48/16* (2009.01)
*H04W 76/10* (2018.01)
*H04W 76/15* (2018.01)

(52) U.S. Cl.
CPC ........... *H04W 48/14* (2013.01); *H04W 48/16* (2013.01); *H04W 76/10* (2018.02); *H04M 2250/06* (2013.01)

(56) References Cited

U.S. PATENT DOCUMENTS

| | | | |
|---|---|---|---|
| 8,374,157 | B2 | 2/2013 | Tamir et al. |
| 2005/0246470 | A1 | 11/2005 | Brenner |
| 2008/0195788 | A1 | 8/2008 | Tamir et al. |
| 2009/0034474 | A1 | 2/2009 | Yavuz et al. |
| 2009/0052344 | A1 | 2/2009 | Fujii |
| 2010/0250789 | A1 | 9/2010 | Collopy et al. |
| 2010/0322213 | A1 | 12/2010 | Liu et al. |
| 2011/0188391 | A1 | 8/2011 | Sella et al. |
| 2012/0087634 | A1 | 4/2012 | Lalwaney |
| 2012/0265913 | A1 | 10/2012 | Suumaki et al. |
| 2013/0007301 | A1 | 1/2013 | Jung et al. |
| 2013/0050122 | A1 | 2/2013 | Kang et al. |
| 2013/0145050 | A1 | 6/2013 | Huang et al. |
| 2014/0126388 | A1* | 5/2014 | Shin ............... H04W 48/20 370/252 |
| 2014/0146745 | A1* | 5/2014 | Huang .............. H04L 63/20 370/328 |
| 2014/0196125 | A1* | 7/2014 | Huang ............... G06F 1/1632 726/5 |
| 2014/0270227 | A1* | 9/2014 | Swanson ........... H04R 1/1016 381/74 |
| 2015/0205747 | A1 | 7/2015 | Dees et al. |

FOREIGN PATENT DOCUMENTS

| | | |
|---|---|---|
| KR | 10-2012-0131438 A | 12/2012 |
| KR | 10-2013-0003645 A | 1/2013 |
| KR | 10-2013-0024615 A | 3/2013 |
| RU | 2443059 C2 | 2/2012 |
| WO | 2012/047946 A1 | 4/2012 |
| WO | 2013/086056 A2 | 6/2013 |
| WO | 2014/057465 A1 | 4/2014 |

OTHER PUBLICATIONS

European Search Report dated Sep. 28, 2016, for European patent application No. 14791698.5.
Korean Notice of Allowance dated Nov. 17, 2016, for Korean patent application No. 10-2015-7026473.
Japanese Office Action dated Jan. 4, 2017, for corresponding Japanese patent application No. 2016-508908.
International Search Report dated Aug. 26, 2014, for International application No. PCT/KR2014/003744.
Office Action dated Jul. 28, 2016, issued by the Canadian Patent Office in Canadian Patent Application No. 2,911,159.
IEEE, "IEEE Standard for Information technology—Telecommunications and information exchange between systems—Local and metropolitan area networks—Specific requirements, Part 11: Wireless LAN Medium Access Control (MAC) and Physical Layer (PHY) Specifications," IEEE802.11-2007, http://ieeexplore.ieee.org/document/4248378/, Jun. 12, 2007.
Dell, "Dell Wireless Dock User Manual," version 1.0, http://downloads.dell.com/manuals/all-products/esuprt_electronics/esuprt_docking_stations/dell-wir-dck_user%27s%20guide2_en-us.pdf, Feb. 2013.
Office Action dated Feb. 17, 2017, issued by the Canadian Patent Office in Canadian Patent Application.
Notice of Allowance dated Feb. 20, 2017, issued by the Russian Patent Office in Russian Patent Application No. 2015151347.
Notice of Allowance dated Aug. 21, 2017, issued by the Japanese Patent Office in Japanese Patent Application No. 2016-508908.
Office Action dated Mar. 19, 2018, issued by the Chinese Patent Office in Chinese Patent Application No. 201480024672.4.

* cited by examiner

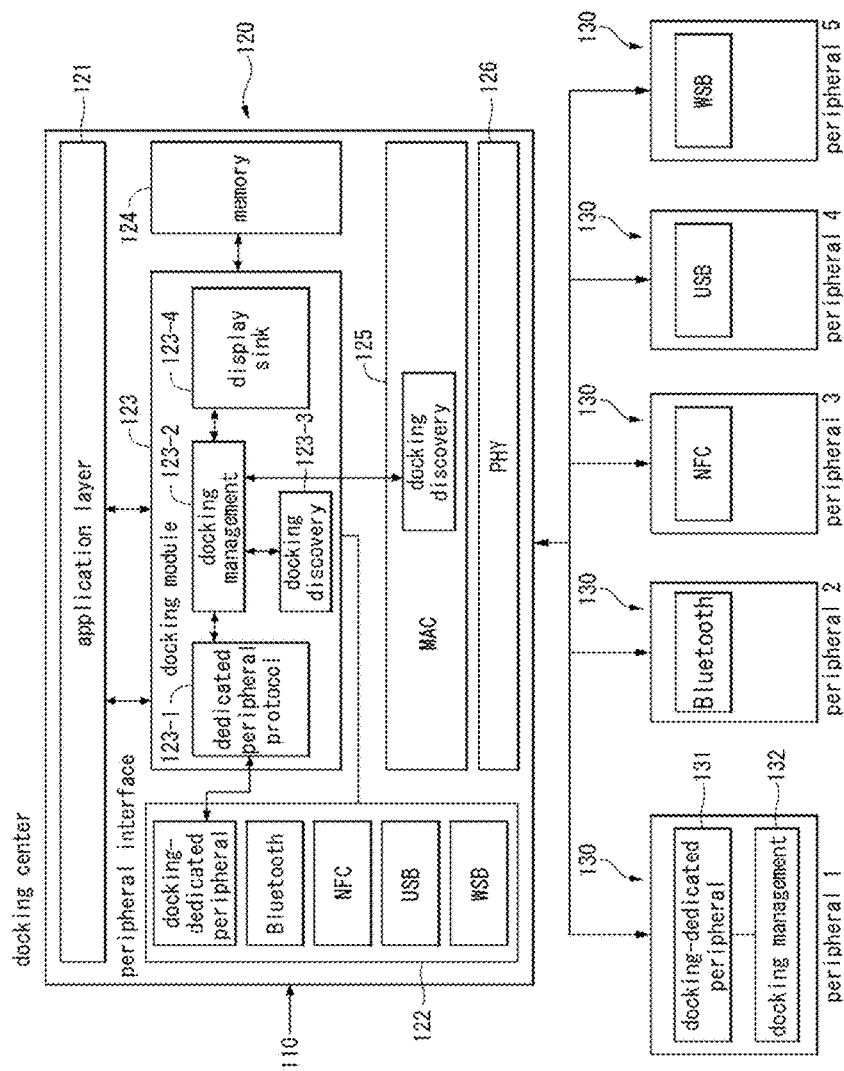

METHOD AND APPARATUS FOR PERFORMING WIRELESS DOCKING SERVICE

TECHNICAL FIELD

The present invention relates to a docking system and, more particularly, to a wireless docking system in a home network environment.

BACKGROUND ART

Related art docking systems for playing (or reproducing) music or images of personal portable devices such as smartphones, or the like, using an external speaker, or the like, are operated by physically connecting the portable devices to a docking center and manipulating a user interface (UI) of the docking center.

Here, for the docking connection, the portable devices should be physically connected, causing users to be limited in using the systems, and due to the limited environment of the physical connection, user application coverage is extremely limited to music play or speaker phones.

DISCLOSURE

Technical Problem

An aspect of the present disclosure provides a wireless docking system capable of performing a docking service without a physical connection between devices.

Another aspect of the present disclosure provides a docking protocol for expanding a usage environment in a wireless docking system.

Another aspect of the present disclosure provides searching for a docking service between devices through a method for docking service discovery in a data link layer and a method for docking service discovery in an application layer.

Another aspect of the present disclosure provides a protocol for pairing between a dockee and a docking center.

Another aspect of the present disclosure provides a docking operation protocol between a dockee and a docking center in order to use a portable device through various input/output devices.

Another aspect of the present disclosure provides a method for terminating a docking connection between a dockee and a docking center.

Another aspect of the present disclosure provides an interface protocol between a docking center and a peripheral in order to support a dedicated peripheral.

Another aspect of the present disclosure provides a method for supporting a wireless docking service in a Wi-Fi direct network.

The technical subjects of the present invention are not limited to the aforesaid, and any other technical subjects not described herein will be clearly understood by those skilled in the art from the embodiments to be described hereinafter.

Technical Solution

According to an aspect of the present disclosure, a method for performing a docking service using Wi-Fi by a wireless dockee (WD) includes: transmitting a probe request including a docking information element (IE) 1 for discovering a wireless docking center (WDC) supporting a docking service; receiving a probe response including a docking IE 2 from a docking center which has received the probe request; and performing a docking connection with the docking center on the basis of the received probe response, wherein the docking IE 1 includes at least one of a docking role parameter indicating performing a role as a dockee, a device name parameter indicating a name of a device, a device ID parameter used to identify a device, and a docking information request parameter indicating a command of a docking service discovery.

The docking IE 2 may include at least one of a docking role parameter indicating performing a role as a docking center, a device name parameter, a device ID parameter, a parameter indicating whether a docking connection to a docking center is available, a wireless docking environment (WDN) number parameter indicating the number of WDNs that can be provided by the docking center, and a WDN default parameter indicating the number of peripherals within each WDN and detailed information of each peripheral.

The performing of docking connection may include: transmitting a provision discover request including docking IE 3 including information items required for performing a docking service with the docking center to the docking center; and receiving a provision discover response including a docking IE 4 including result information regarding the docking connection requested by the dockee through the provision discover request, from the docking center.

The docking IE 3 may include at least one of a docking role parameter indicating performing of a role as a dockee, a parameter indicating a WDN to be used, and a parameter indicating each peripheral to be used.

The docking IE 4 may include at least one of a docking role parameter indicating performing of a role as a docking center, a parameter indicating a Wi-Fi connection type that can be provided to the dockee, and a parameter indicating docking connection protocol information.

The method may further include: establishing an Internet protocol (IP)-based connection with the docking center.

The join request may include at least one of an RW_mode parameter indicating a read and/or write function of each device within a WDN, an authority type parameter indicating whether a peripheral dependent on the docking center can be preoccupied or shared, an RW_mode parameter indicating a read and/or write function of each peripheral selected to be used, and an authority type parameter indicating whether each peripheral selected to be used is preoccupied or shared.

The join response may include at least one of a docking role parameter indicating classification of a role of the dockee or the docking center, and a parameter indicating Wi-Fi display connection information.

The method may further include: transmitting a command message to the docking center; and receiving a response message with respect to the command message from the docking center.

The command message may include at least one of a parameter indicating a request for selecting an additional WDN, a parameter indicating a request for releasing a connection to a currently docking connected WDN, a parameter indicating a request for selecting an additional peripheral, a parameter indicating a request for releasing a connection with a peripheral, a parameter indicating a request for releasing a docking connection, a parameter indicating a request for securing WDN information, and a parameter indicating a request for securing information of a specific peripheral.

The method may further include: receiving a command message from the docking center; and transmitting a response message with respect to the command message to the docking center.

The method may further include: transmitting an event notification message for indicating occurrence of an event to the docking center; and receiving a positive response (ACK) with respect to the event notification message from the docking center.

The event notification message may include at least one of a docking role parameter indicating classification of a role as a dockee or a docking center, a change parameter indicating a parameter change, a parameter indicating a change in WDN usability, and a parameter indicating a change in peripheral usability.

The change in parameter may be a change in transmission power parameter or an operation channel parameter.

The method may further include: after the probe response is received, outputting a docking center list to a user interface; and selecting any one docking center to perform a docking connection from the output docking center list.

The join request may be transmitted to the docking center when result information regarding the docking connection is set to "connection permission' in the received provision discover response.

According to another aspect of the present disclosure, a method for performing a docking service using Wi-Fi by a wireless dockee (WD), may include: transmitting a docking request for a docking connection with a wireless docking center (WDC) to the docking center; and receiving a docking response as a response to the docking request from the docking center, wherein the docking response includes docking center information and peripheral information related to the docking center.

The docking request may include at least one of a docking center ID parameter identifying a docking center to which a docking connection is to be performed, a peripheral number parameter indicating the number of peripherals that can be supported by the docking center, and a peripheral list parameter indicating detailed information of each peripheral.

The docking response may include at least one of a peripheral number parameter indicating the number of peripherals that can be supported by the docking center and a peripheral list parameter indicating detailed information of each peripheral.

According to another aspect of the present disclosure, a method for performing a docking service using Wi-Fi by a wireless docking center (WDC), may include: receiving a docking request for a docking connection from a wireless dockee (WD); transmitting detailed information request for requesting detailed information of a peripheral to the peripheral;

receiving detailed information from the peripheral as a response to the detailed information request; and transmitting a docking response as a response to the docking request to the dockee, wherein the detailed information request includes at least one of a docking center ID parameter identifying a docking center and a peripheral ID parameter identifying a parameter corresponding to the detailed information request target.

The detailed information received from the peripheral may include a docking center ID parameter, a parameter indicating the number of connected docking centers, and a parameter indicating detailed peripheral information.

The method may further include: transmitting a peripheral event notification message indicating occurrence of an event in the peripheral to the dockee.

The method may further include: receiving a peripheral event message including event information which has occurred in a peripheral from the peripheral; and transmitting a peripheral event notification information indicating the occurrence of the event in the peripheral to the dockee.

The peripheral event notification message may include at least one of a peripheral number parameter indicating the number of controllable peripherals and a parameter indicating a list of detailed information of peripherals.

The method may further include: receiving a close request message for requesting closing of the use of the docking service from the dockee; and transmitting a close response message as a response to the close request to the dockee.

The method may further include: exchanging a heart beat message for determining whether a connection between the dockee and the docking center is maintained.

The exchanging a heart beat message for determining whether the connection is maintained may include: transmitting a heart bit message for determining whether the connection is maintained to the dockee; and receiving a response with respect to the heart beat message from the dockee.

The heart beat message may be continuously transmitted at predetermined intervals by a predetermined number of times, and the method may further include: when the response is not received by the number of heart beat messages transmitted to the dockee, from the dockee, transmitting a close notification message indicating that the docking connection has been closed to the dockee.

The method may further include: receiving an authority request for requesting transfer authority to control of a peripheral from the dockee; and transmitting an authority response message including information indicating whether transfer of authority to control is permitted for each peripheral to the dockee.

The authority request may include information regarding a list of at least one peripheral which desires to transfer the authority to control.

Information indicating whether 'preemption' or 'sharing' of a peripheral as a target of the request for transfer of authority to control may be included in the authority request or the authority response.

The parameter indicating detailed peripheral information may include information indicating a type of an available peripheral.

According to another aspect of the present disclosure, a device for performing a docking service using Wi-Fi may include: a communication unit configured to perform communication with the exterior wiredly or wirelessly; and a control unit functionally connected to the communication unit, wherein the control unit controls the communication unit to transmit a probe request including docking information element (IE) 1 for discovering a wireless docking center (WDC) supporting the docking service, controls the communication unit to receive a probe response including a docking IE 2 from a docking center which has received the probe request, and controls the communication unit to perform a docking connection with the docking center on the basis of the received probe response, wherein the docking IE 1 includes at least one of a docking role parameter indicating performing a role as a dockee or a docking center, a device name parameter indicating a name of a device, a device ID parameter used to identify a device, and a docking information request parameter indicating a command of a docking service discovery.

According to another aspect of the present disclosure, a device for performing a docking service using Wi-Fi may include: a communication unit configured to perform communication with the exterior wiredly or wirelessly; and a control unit functionally connected to the communication unit, wherein the control unit controls the communication unit to receive a docking request for a docking connection from a wireless dockee (WD), controls the communication unit to transmit a detailed information request for requesting detailed information of a peripheral from the peripheral, and controls the communication unit to receive detailed information as a response to the detailed information request from the peripheral and transmit a docking response as a response to the docking request to the dockee, wherein the detailed information request includes at least one of a docking center ID parameter identifying a docking center and a peripheral ID parameter identifying a peripheral corresponding to a detailed information request target.

Advantageous Effects

Thus, in the present disclosure, when a small personal portable device is used, the display device such as a monitor various input/output devices such as a keyboard, a mouse, and a printer may be utilized, maximizing user convenience.

Also, in the present disclosure, since there is no physical connection between a device constituting a user convenience environment and a personal portable device, there is no physical environmental restrictions in operating a docking service, and expansion of applicable user cases may be facilitated.

Effects of the present disclosure are not limited to the foregoing effects and any other effects not mentioned will be understood from the following descriptions and become apparent by exemplary embodiments of the present invention.

BRIEF DESCRIPTION OF THE DRAWINGS

The above and other aspects, features and other advantages of the present invention will be more clearly understood from the following detailed description taken in conjunction with the accompanying drawings, in which:

FIG. 2B is a view illustrating an example of an internal block diagram of a docking center and peripherals proposed in the present disclosure.

MODE FOR INVENTION

Hereinafter, embodiments of the present disclosure will be described in detail with reference to the accompanying drawings.

In the following description, usage of suffixes such as 'module', 'part' or 'unit' used for referring to elements is given merely to facilitate explanation of the present invention, and the 'module' and 'part' or 'unit' may be mixedly used.

A device described in the present disclosure is a device available for wireless communication, which may include a cellular phone including a smartphone, a tablet PC, a desktop computer, a notebook computer, or a television including a smart TV or an IPTV.

Also, embodiments of the present disclosure will be described in detail with reference to the accompanying drawings and contents described in the accompanying drawings hereinafter, but the present disclosure is not limited thereto.

The terms used in this specification were selected to include current, widely-used, general terms, in consideration of the functions of the present invention. However, the terms may represent different meanings according to the intentions of the skilled person in the art or according to customary usage, the appearance of new technology, etc.

In certain cases, a term may be one that was arbitrarily established by the applicant. In such cases, the meaning of the term will be defined in the relevant portion of the detailed description.

As such, the terms used in the specification are not to be defined simply by the name of the terms but are to be defined based on the meanings of the terms as well as the overall description of the present invention.

Figure 1:
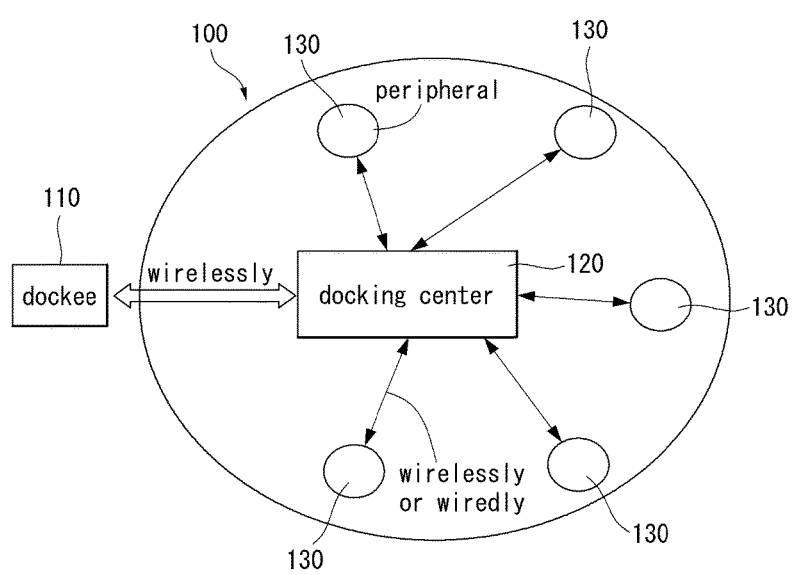
FIG. 1 is a view illustrating an example of a wireless docking system proposed in the present disclosure.

FIG. 1 is a view illustrating an example of a wireless docking system proposed in the present disclosure.

The wireless docking system may also be expressed as a Wi-Fi docking system.

As illustrated in FIG. 1, the wireless docking system 100 includes a dockee 110, a docking center 120, and a peripheral 130. The dockee 110, the docking center 120, and the peripheral 130 are main components constituting the wireless docking system 100, and here, the wireless docking system 100 may further include any other component.

First, the dockee 110, a target device for utilizing the wireless docking system 100, may be a smartphone, a laptop computer, a tablet PC, a portable player (e.g., an MP3, or the like), a portable game console, and a camera.

The dockee 110 may also be expressed as a wireless dockee (WD) or a Wi-Fi dockee, and may be connected to the docking center 120 to select a series of peripheral devices for docking with the dockee 110.

The docking center 120 may be wiredly or wirelessly connected with various peripherals.

The docking center 120 refers to a device for controlling the dockee 110, that is, a target device to which the dockee 120 is to be paired. Also, the docking center 120 may have a display function according to circumstances. The docking center 120 may be a monitor, a TV, a tablet PC, separate network equipment. The separate network equipment refers to an access point (AP), a router, or a gateway.

The peripheral 130 refers to a peripheral device such as an input/output device or a convenience device that may be directly used by a user, which is a hardware component performing at least one peripheral function (PF).

The peripheral 130 may be a home automation device such as a mouse, a keyboard, a game pad, a speaker/microphone, a projector/display, car equipment, a printer/scanner, or lighting.

When the dockee 110 docks to the docking center 120, a Wi-Fi peripheral such as a WSB or a Wi-Fi display may be directly connected to the dockee 110 or may be connected to the dockee 110 in a relay manner through the docking center 120.

Figure 2A:
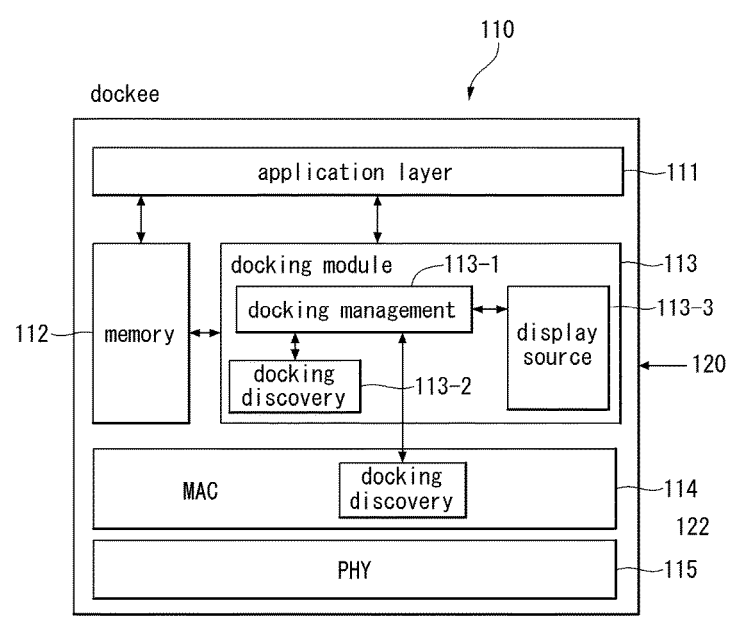
FIG. 2A is a view illustrating an example of a internal block diagram of a dockee proposed in the present disclosure.

FIGS. 2A and 2B are views illustrating examples of internal blocks of the dockee 110, the docking center 120, and the peripheral 130 proposed in the present disclosure.

The dockee 110 illustrated in FIG. 2A and the docking center 120 and the peripheral 130 illustrated in FIG. 2B may be connected wiredly or wirelessly.

First, the dockee 110 includes an application layer 111, a memory 112, a docking module 113, a wireless medium access control (MAC) layer 114, and a wireless physical (PHY) layer 115.

The docking module 113 includes a docking management module 113-1, a docking discovery module 113-2, and a display source 113-3.

The docking center 120 includes an application layer 121, a peripheral interface 122, a docking module 123, a memory 124, a wireless MAC layer 125, and a wireless physical layer 126.

The peripheral interface 122 may be configured as an interface of a docking dedicated peripheral, Bluetooth, near-field communication (NFC), universal serial bus (USB), or a Wi-Fi serial bus (WSB).

The docking module 123 includes a protocol for a dedicated peripheral (or a dedicated peripheral protocol) 123-1, a docking management module 123-2, a docking discovery module 123-3, and a display sink 123-4.

The wireless MAC layers of the dockee 110 and the docking center 120 include a docking discovery module.

The dockee 110 and the docking center 120 are wirelessly connected through Wi-Fi.

The peripheral 130 is connected to the docking center 120 wiredly or wirelessly. Referring to FIGS. 2A and 2B, the docking center 110 is connected to five peripherals 130.

A peripheral 1, a docking dedicated peripheral, includes a docking dedicated peripheral function module 131 and a docking management module 132

A peripheral 2 is a peripheral available for Bluetooth communication, a peripheral 3 is a peripheral available for NFC communication, a peripheral 4 is a peripheral available for USB communication, and a peripheral 5 is a Wi-Fi serial bus (WSB) available for Wi-Fi communication.

A MAC protocol and a PHY protocol of the dockee 110 and the docking center 120 will be described in detail.

First, when a request for transmission of data is received from a MAC protocol, the PHY protocol serves to perform forward error correction (FEC) encoding, modulation, and insertion of an additional signal such as a preamble or pilot, on the requested data, and transmit the same to a communication unit.

Also, when a signal transmitted from a transceiver unit is received, the PHY protocol serves to perform demodulation, equalization, FEC decoding, and configuration of the signal added in the PHY protocol on the reception signal, and transmit data according to the MAC protocol.

In order to perform the foregoing function, the PHY protocol may include a modulator, a demodulator, an equalizer, an FEC encoder, and an FEC decoder.

In order to deliver or transmit data delivered from a higher layer to the PHY protocol, the MAC protocol may perform a required process, and is responsible for an additional transmission to perform basic communication.

To this end, the MAC protocol serves to process the data requested to be transmitted by the higher layer into a form that can be appropriate for transmission, and deliver and transmit the same to the PHY protocol, and also serves to process reception data delivered from the PHY protocol and deliver the same to a higher layer.

Also, the MAC protocol is responsible for any other additional transmission and reception required for data delivery, thereby processing a communication protocol.

Figure 2C:
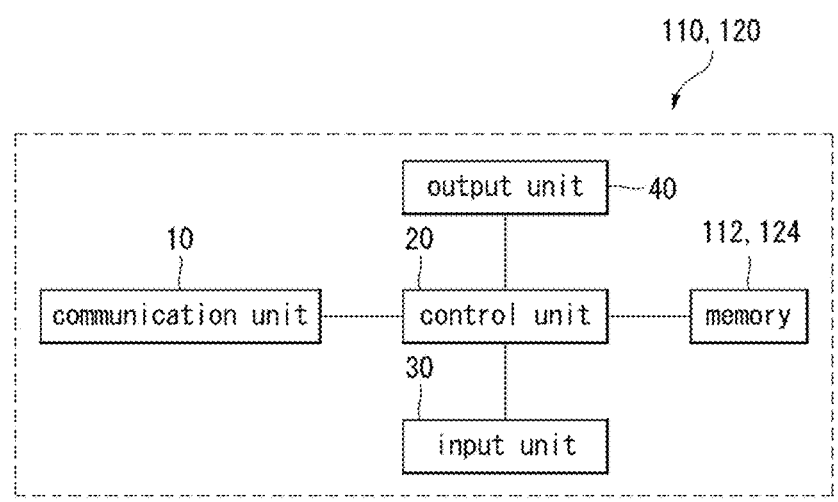
FIG. 2C is a view illustrating another example of an internal block diagram of a dockee and a docking center proposed in the present disclosure.

FIG. 2C is a view illustrating another example of an internal block diagram of the dockee and the docking center proposed in the present disclosure.

As illustrated in FIG. 2C, the dockee 110 and the docking center 120 include a communication unit (or a transceiver unit) 10, a control unit 20, an input unit 30, an output unit 40, and a memory 112 or 124.

The communication unit 10, the control unit 20, the input unit 30, the output unit 40, and the memory 112 or 124 are functionally connected to perform the method proposed in the present disclosure.

When information generated by the PHY protocol is received, the communication unit (transceiver unit or a radio frequency (RF) unit) 10 moves the received information to an RF spectrum, performs filtering and amplification on the received information, and transmits the same to an antenna. Also, the communication unit 10 serves to move an RF signal received by the antenna to a band that can be processed by the PHY protocol, and perform filtering thereon.

The communication unit 10 may have a switch function for switching the transmission and reception functions.

The control unit 20 implements the function, process, and/or method proposed in the present disclosure. Layers of the wireless interface protocol may be implemented by the control unit 20.

That is, in order to perform a wireless docking service for Wi-Fi, the control unit 20 may control docking discovery, a docking operation, docking pairing, and a docking closing operation.

Also, the control unit 20 controls the communication unit 10 to transmit a probe request including a docking information element 1 for discovering a wireless docking center (WDC) supporting the docking service, controls the communication unit 10 to receive a probe response including a docking information element 2 from the WDC which has received the probe request and perform docking connection with the docking center on the basis of the received probe response.

Also, the control unit 20 controls the communication to receive a docking request (Docking Request) for docking connection from the dockee (wireless dockee (WD)) 110, controls the communication unit to transmit detailed information request for requesting detailed information of a peripheral to the peripheral, receive detailed information as a response to the detailed information request from the peripheral, and transmit a docking response (Docking Response) as a response to the docking request to the dockee 110.

The memory 112 or 124 is connected to the control unit 20 and stores a protocol or a parameter for performing a wireless docking service using Wi-Fi.

The control unit 20 may include an application-specific integrated circuit (ASIC), other chip set, a logic circuit, and/or a data processing device. The memory 112 or 124 may include a read-only memory (ROM), a random access memory (RAM), a flash memory, a memory card, a storage medium and/or any other storage device. The communication unit 10 may include a baseband circuit for processing a wireless signal. When an embodiment is implemented by software, the foregoing scheme may be implemented by the modules (processes, functions, and the like) performing the foregoing functions. The modules may be stored in the memory and may be executed by the control unit 20. The memory 112 or 124 may be disposed within or outside of the control unit 20 and may be connected to the control unit 20 through various well-known units.

The output unit (or display unit) 40 is controlled by the control unit 20, and output information items output from the control unit 20, together with a key input signal generated by a key input unit (not shown) and various information signals from the control unit 20.

Figure 3:
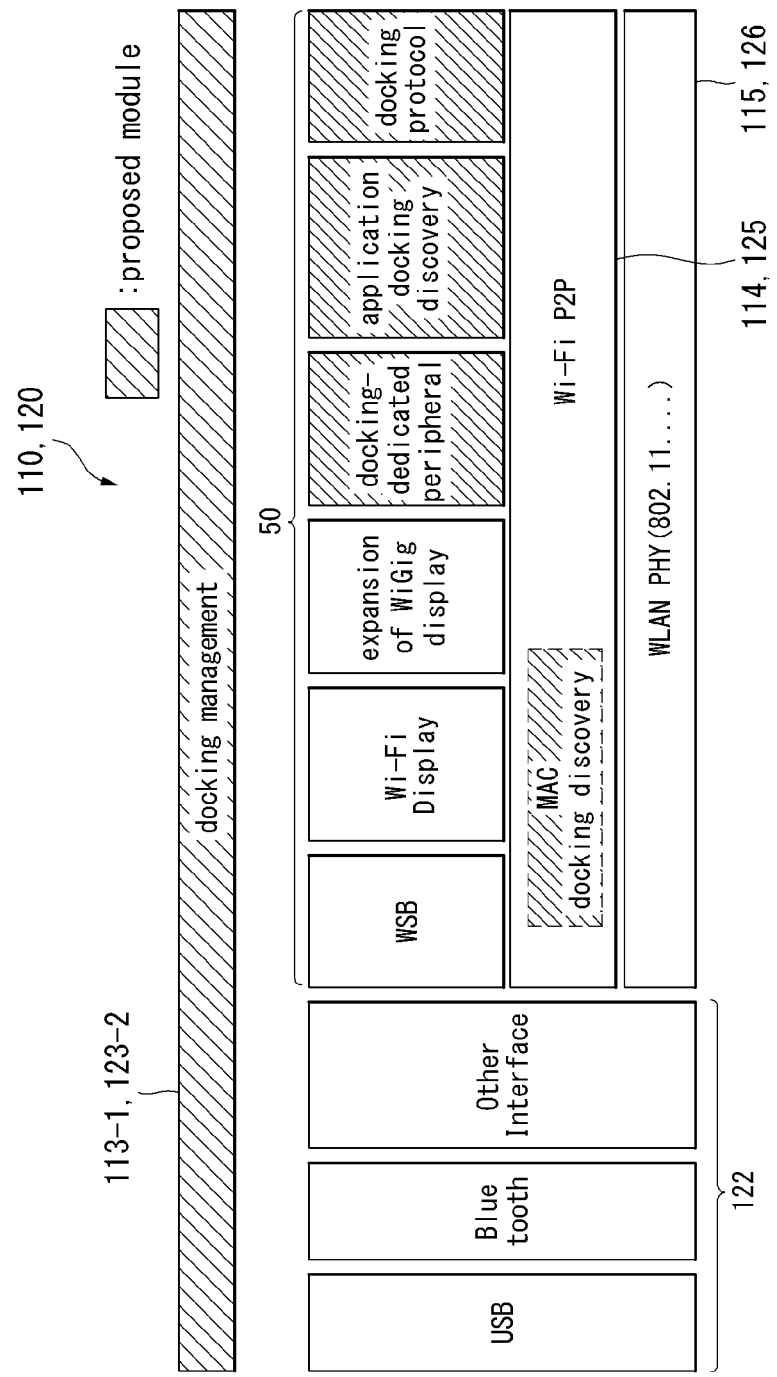
FIG. 3 is a view schematically illustrating an internal configuration of a dockee and a docking center proposed in the present disclosure in a functional aspect.

FIG. 3 is a view schematically illustrating an internal configuration of the dockee and the docking center proposed in the present disclosure in a functional aspect.

As illustrated in FIG. 3, the docking management modules 113-1 and 123-2 manage and control connection to a target device, access and usage history, and device information in the dockee and the docking center.

A docking protocol is a protocol for controlling, monitoring, and information exchanging between the dockee and the docking center.

A docking discovery module performs a discovery (search or finding) function to search neighboring devices for a device providing a wireless docking system.

Here, there are a MAC docking discovery performed in the MAC layer and an application docking discovery performed in an application layer.

The MAC docking discovery functions to search whether docking is supported before establishing an IP-based association in a data link layer.

The application docking discovery functions to search whether a docking is supported in an application layer when the MAC docking discovery function cannot be used.

A dedicated peripheral protocol does not support a commercial interface such as a USB or Bluetooth and serves to support only a wireless docking system.

Docking Discovery

Hereinafter, a docking discovery procedure for performing a docking service proposed in the present disclosure will be described.

The docking discovery includes a MAC layer docking discovery procedure and an application layer docking discovery procedure.

First, the MAC layer docking discovery procedure will be described.

A MAC responsible for a data link layer in Wi-Fi wireless communication performs a probing or beacon procedure, an authentication procedure, and an association procedure before an L2 connection establishment.

The foregoing procedures may need to perform channel scanning, or the like, according to circumstances, so a large amount of time may be taken.

A communication protocol of every application layer is started after completion of the MAC connection establishment procedure, and the discovery procedure for wireless docking cannot be performed until the MAC connection procedure is completed, even though a docking target device is located within a communication available distance.

Due to performing of the data link procedure, docking discovery in the application layer require a relatively longer period of time to perform. Also, as the number of neighbor devices increases, the time for performing the docking discovery procedure is increased proportionally.

Information items transmitted and received between the dockee, the docking center, and the peripherals described hereinafter may be transmitted and received in the form of a message, a frame, signaling, or a primitive.

MAC Layer Docking Discovery

Figure 4A:
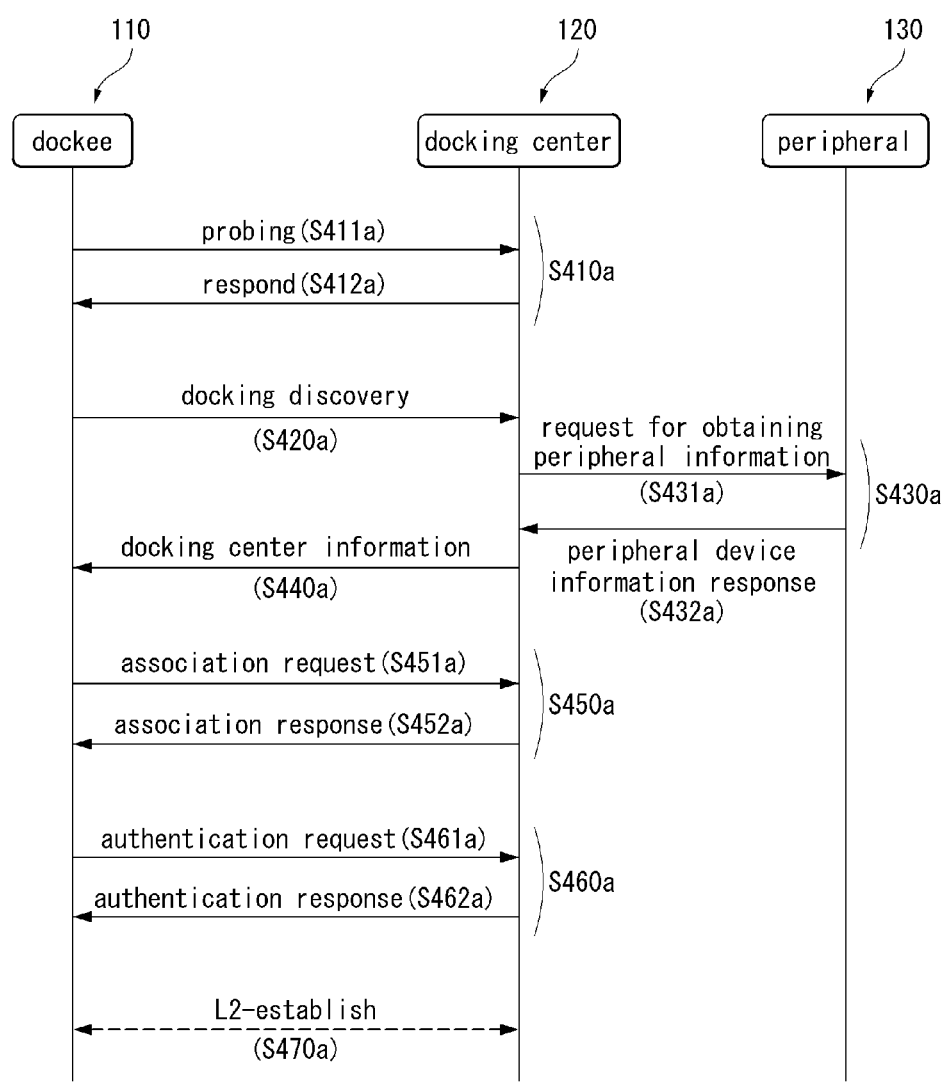
FIG. 4A is a flow chart illustrating an example of a MAC layer docking discovery procedure proposed in the present disclosure.

FIG. 4A is a flow chart illustrating an example of a MAC layer docking discovery procedure proposed in the present disclosure.

First, in order to search for a docking center present nearby (adjacency, proximity, surrounding), the dockee transmits probing or a probe request (S411a).

Thereafter, upon receiving the probing, the docking center transmits a response with respect to the probing, that is, a probe response, to the dockee (S412a).

Thereafter, in order to recognize whether a docking service is supported, the dockee broadcasts a docking discovery to the docking center (S420).

The docking discovery (message) includes information of Table 1 below.

TABLE 1

<Docking Discovery>

| Parameter | Type | Selective Value | Description |
| --- | --- | --- | --- |
| Dockee_ID | Unsigned Int | None | Dockee ID value |

In Table 1, a dockee identifier (Dockee ID) parameter denotes an ID for identifying a dockee.

Thereafter, the docking center transmits a peripheral information request (Get_Peripheral_Info) to a peripheral which can be connected to the docking center, which is dependent thereon, or which can be controlled to request information thereof (S431a).

The peripheral information request message includes information of Table 2 below.

TABLE 2

<Get_Peripheral_Info>

| Parameter | Type | Selective Value | Description |
| --- | --- | --- | --- |
| Docking_Center_ID | Unsigned Int | None | Docking Center ID value |

In Table 2, the Docking_Center_ID parameter denotes an ID for identifying a docking center.

Thereafter, upon receiving the peripheral information request from the docking center, the peripheral transmits peripheral information response including detailed information thereof to the docking center (S432b).

The peripheral information message includes information such as shown in table 3 below.

TABLE 3

<Peripheral_Info>

| Parameter | Type | Selective Value | Description |
| --- | --- | --- | --- |
| Docking_Center_ID | Unsigned Int | None | Docking Center ID value |
| Peripheral_List | Structure Array (Peripheral_Summary_t) | None | Information of Peripheral list (See Table 4) |

In Table 3, the Peripheral_List parameter denotes information of peripheral list, and details may be referred to Table 4.

TABLE 4

<Peripheral_Summary_t>

| Parameter | Type | Selective Value | Description |
| --- | --- | --- | --- |
| Peripheral_ID | Unsigned Int | None | Docking Center ID value |
| Dev_name | String | None | Device Name |
| Peripheral_Type | Enum | Mouse Keyboard Printer/ Scanner Display Home Automation | Usable Device Type (장치 종류) |

In Table 4, the Peripheral Type parameter denotes a type of an available peripheral, and may denote a mouse, a keyboard, a printer/scanner, a display, and home automation according to a set value.

Thereafter, the docking center transmits docking center information (Docking_Center_Info) including information of the docking center to the dockee (S440a).

The docking center information includes information items illustrated in Table 5 below.

TABLE 5

<Docking_Center_Info>

| Parameter | Type | Selective Value | Description |
| --- | --- | --- | --- |
| Dockee_ID | Unsigned Int | None | Dockee ID value |
| Docking_Center_ID | Unsigned Int | None | Docking Center ID value |
| Dev_name | String | None | Device Name |

TABLE 5-continued

<Docking_Center_Info>

| Parameter | Type | Selective Value | Description |
| --- | --- | --- | --- |
| Num_Connected_Dockee | Unsigned Int | None | Number of connected Dockee (Number of dockees connected to docking Center) |
| Num_Peripheral | Unsigned Int | None | Number of supportable Peripheral (Number of peripherals connected to docking Center) |
| Peripheral_List | Structure Array (Peripheral_Summary_t) | None | Summary of Peripheral list (summary information of available peripherals) |

In Table 5, the docking center ID parameter denotes an ID for identifying a docking center, the Dev name parameter denotes a name of a device, and the Num Connected Dockee parameter denotes the number of dockees currently connected to the docking center.

Also, the Numn Peripheral parameter denotes the number of peripherals connected to the docking center, the Peripheral List parameter denotes the number of peripherals connected to the docking center, and the Peripheral List parameter denotes available peripherals and summary information thereof, details thereof may be referred to Peripheral Summary of Table 4.

Thereafter, the dockee recognizes whether the docking service is supported on the basis of the docking center information received from the docking center, and performs an association process with the docking center (S450a).

Here, during the association process, the dockee transmits an association request (Association Req.) to the docking center (S451a), and the docking center transmits an association response (Association Rsp.) as a response to the association request, to the dockee (S452a).

When the association procedure between the dockee and the docking center is completed, the dockee and the docking center performs an authentication procedure (S460a).

During the authentication procedure, the dockee transmits an authentication request (Authentication Req.) to the docking center (S461a), and the docking center transmits an authentication response, as a response to the authentication request, to the dockee (S462a).

When the authentication procedure between the dockee and the docking center is completed, a Layer-2 connection is established between the dockee and the docking center (S470a).

Hereinafter, a MAC layer docking discovery procedure for performing the docking service using Wi-Fi will be described.

First, in a Wi-Fi direct network (system or environment), a MAC layer discovery procedure is performed using a service discovery procedure.

Figure 4B:
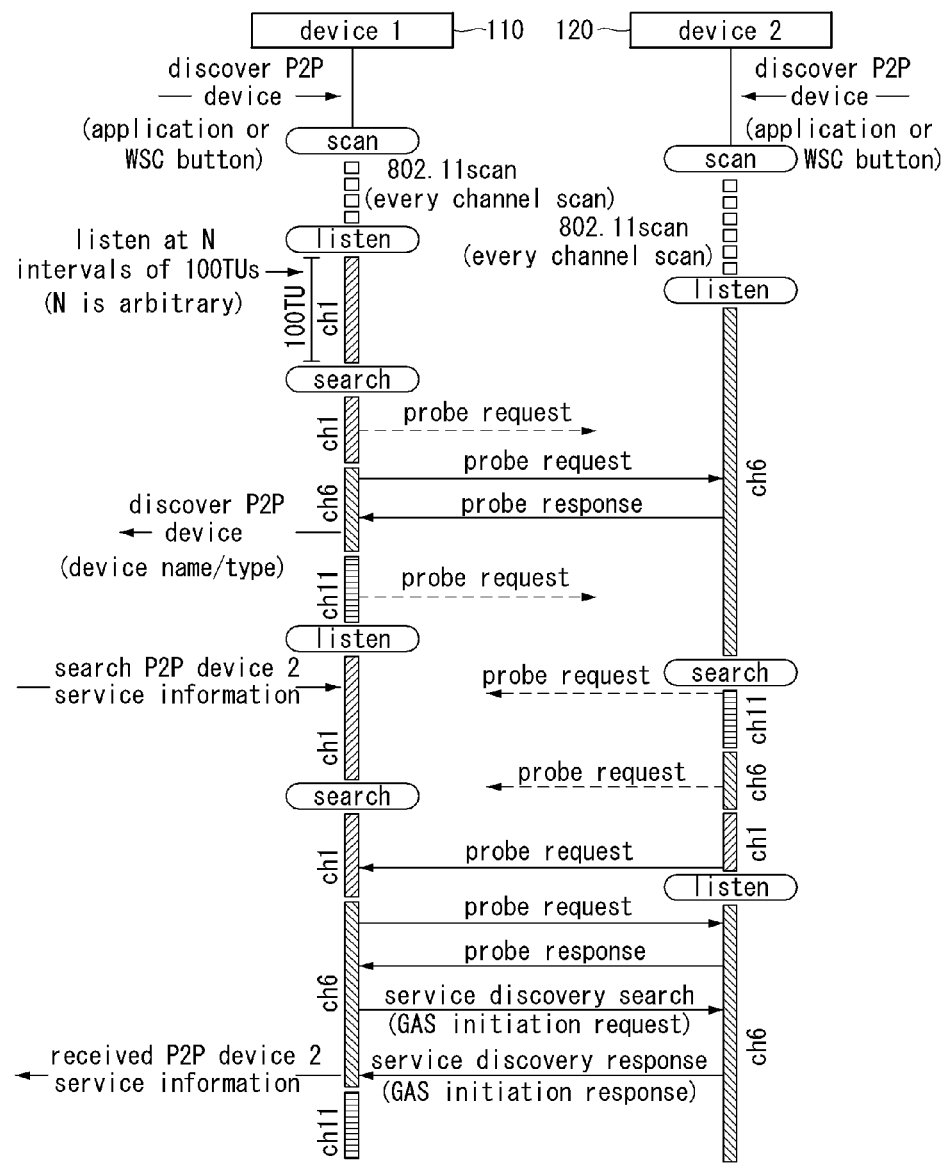
FIG. 4B is a view illustrating a service discovery procedure in a Wi-Fi direct network.

FIG. 4B is a view illustrating a service discovery procedure in a Wi-Fi direct network.

The Wi-Fi direct network (or system) includes at least one Wi-Fi device. Here, the Wi-Fi device refers to a device able to perform Wi-Fi communication, and the Wi-Fi direct network may be expressed as a peer-to-peer (P2P) network.

Wi-Fi devices within the Wi-Fi direct network may be directly connected to each other without using a wireless location area network (WLAN) access point (AP). To this end, the Wi-Fi devices implement a new firmware protocol.

A P2P discovery procedure allowing P2P devices (or Wi-Fi devices) to rapidly discover each other and to be connected to each other in the Wi-Fi direct network will be described with reference to FIG. 4B.

The P2P discovery procedure may be classified as
1) a device discovery procedure and 2) a service discovery procedure.

The devices within the Wi-Fi direct network perform the device discovery process for recognizing each other before being connected through the Wi-Fi direct network.

The devices within the Wi-Fi direct network perform the service discovery process to exchange predetermined information with a device searched through the device discovery process to thereby know service information provided by the searched device.

Device Discovery

A purpose of the P2P device discovery is to search for P2P devices and determine a P2P device to which connection is to be attempted. The P2P device discovery includes two main steps, that is, a scan phase and a find phase.

In the device discovery process, in order to exchange device information a probe request frame and a probe response frame are used. P2P devices of a P2P group are discovered through a probe response frame from a P2P group owner (GO).

The P2P device do not response to the probe request frame unless it is 1) a P2P group owner, 2) it is in a listen state, or 3) it is not a P2P device connected to an infrastructure AP in a channel through which the probe request has been sent.

Hereinafter, the listen state, the scan phase, and the fine phase will be described in detail.

Listen State

A P2P device not included in the P2P group may use the listen state in order to be discovered.

In the listen state, the P2P device is present in a given channel of a listen channel. The listen channel is a channel selected from a list of social channels. In 2.4 GHz, channel 1, channel 6, and channel 11 will be used as social channels.

The listen channel will be selected at a start stage of the device discovery and remain the same until the P2P discovery is completed.

The find phase creates the use of the listen state. In the fine phase, the P2P device may stay in the listen state during a time period defined in the find phase, and may be constantly used during the corresponding time period.

When not in the fine phase, the P2P device may stay in the listen state during an extended time period. The P2P device may use the listen state during a continuous period of 500 ms of at least every 5 seconds to enable other devices to discover the P2P device.

Scan Phase

The scan phase may be used to search for P2P devices or a P2P group by the P2P device or position the best latent operation channel to establish a P2P group.

In the scan phase, information regarding nearby devices or network is collected by scanning all the channels supported for devices.

In the scan phase, the P2P device will not respond to a probe request frame.

The P2P device may scan P2P groups and legacy networks (for example, 802.11 infrastructure networks) simultaneously.

Find Phase

The find phase is use to guarantee that two P2P devices simultaneously performing searching reach a common channel allowing for communication.

This part may be formed as the P2P device circulates between a state in which the P2P device waits in a fixed channel during a probe request frame (that is, a listen state) or a state in which a probe request frame is sent in a fixed channel list (that is, a search state).

Convergence of two devices in the same channel is assisted by randomizing a time consumed in each cycle of the listen state. A convergence time is minimized by limiting a channel list to a small set known as a social channel.

In the fine phase, the P2P device will be exchanged between the listen state and the search state.

A duration time of each listen state in the find phase will be a certain integer at an interval of 100 TU. The certain number will not be greater than a maximum discoverable interval value and will not be smaller than a minimum discoverable interval value.

A determined value of the maximum discoverable interval and a determined value of the minimum discoverable interval are 3 and 1, respectively. Randomization in the time consumed in the listen state allows for avoiding a situation in which two P2P devices cannot find out each other in a lock step of the find phase.

While in the listen state of the find phase, the P2P device will be constantly used in a listen channel.

Service Discovery

Hereinafter, the service discovery procedure will be described in more detail.

As a service discovery response frame, a generic advertisement service (GAS) initial response frame defined in IEEE P802.11u is used.

Since the service discovery response frame supports different search types, vender-specific content may include other fields. A service exchange ID is included in both service request and service response type length values (TLVs) and is used to be matched to a response with respect to a request.

When a service discovery query frame is used for both services and higher layer service protocol types, a service discovery response frame may include a plurality of service response TLVs.

Each of the service response TLVs will include a service protocol type (for example, Bonjour, UPnP, etc.) set as one of values not '0' defined in a service protocol type.

The service exchange ID is set to a value corresponding to a service exchange ID in a service request TLV. A state code field of each returned service TLV is set to service availability. Available service information is included in a response data field.

The response data field will include service data present in a service information type and a service protocol type. If any service is not available to be used, one service response TLV is returned as a 'null' value in a service protocol type field the same as '0' and a state code field and a response data field set by an appropriate error code.

When the service discovery query frame includes a plurality of service request TLVs for a plurality of higher layer services and one or more service protocol types, the service discovery response frame will include a plurality of service response TLVs.

At least one service response TLV will be returned as each of corresponding service request TLVs by the service exchange ID. Each of the service response TLVs will include a service type field set to one of values not '0' defined in a table corresponding to a requested service protocol type. The service exchange ID is set to a value corresponding to a service exchange ID in the service request TLV.

If a service is available to be used, the state code field is set to service availability and a response data field includes a corresponding requested service information type and service data.

If a service is not available to be used, the state code field is set to an appropriate error state value and a response data field has a 'null' value.

A service update indicator will be included in all of service discovery response frames. The service update indicator will be increased whenever service information of a P2P device which sends the service update indicator in a service discovery response is changed.

The service update indicator permits the P2P device to store service information obtained from another P2P device together with the service update indicator.

Whenever the P2P device recognizes that the service update indicator for the different P2P device increases, it may know that stored service information is sent for the corresponding P2P device.

If a service discovery response frame having a plurality of service response TLVs exceeds a GAS initial response packet size, the rule for GAS segments using a GAS comeback request and response will be used as being defined in IEEE P802.11u.

To sum up, the service discovery process uses the service discovery request frame and the service discovery response frame, for exchange of service information provided by each device.

The service discovery request frame and the service discovery response frame are generated by using a generic advertisement service (GAS) initial request frame and GAS initial response frame of IEEE 802.11u, respectively.

Each device may obtain information of a service provided from a counterpart of the service discovery through the service discovery process.

Figure 4C:
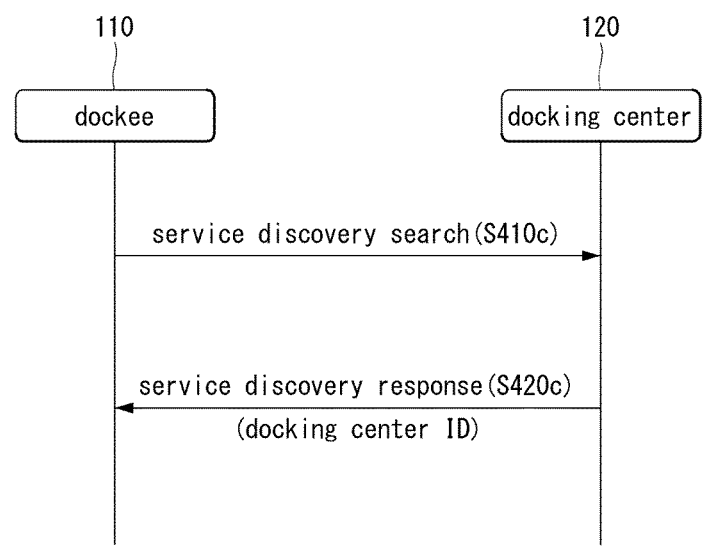
FIG. 4C is a flow chart illustrating a method for performing docking discovery using a service discovery in a Wi-Fi direct network proposed in the present disclosure.

FIG. 4C is a flow chart illustrating a method for performing docking discovery using a service discovery in a Wi-Fi direct network proposed in the present disclosure.

As illustrated in FIG. 4C, in order to determine whether the docking center supports a Wi-Fi docking service, the dockee transmits a service discovery request (SD_Query) frame including a Wi-Fi docking (or docking discovery) service protocol type field to the docking center (S410c).

Thereafter, the docking center transmits a service discovery response (SD_Discovery) frame including a docking center ID to the dockee, as a response with respect to the service discovery request frame (S420c).

A process required for performing the docking discovery procedure, excluding steps S410c and S420c, will be referred to FIG. 4B.

Table 6 below illustrates an example of the service discovery request frame TLV fields.

TABLE 6

<Service Request TLV Fields>

| Field Name | Size (octets) | Value | Description |
|---|---|---|---|
| Length | 2 | Variable | Length of the Service Request TLV |
| Service Protocol Type | 1 | Table 63 | Service protocol types |
| Service Transaction ID | 1 | Variable | Service transaction ID is a nonzero value used to match the Service Request/Response TLVs. |
| Query Data | Variable | NA | Query data for the requested service information |

In Table 6, the Length field denotes a length of the service request frame TLV, the Service Protocol Type field denotes a service protocol type supported by a device, and specific types of each service protocol type are illustrated in Table 7. The Service Transaction ID is a value not '0' used for matching TLVs of a service request frame and a service response frame. The Query Data denotes request data of requested service information.

Table 7 below illustrates an example of the Service Protocol Type of Table 6.

TABLE 7

<Service Protocol Types>

| Value | Meaning |
|---|---|
| 0 | All Service Protocol Types |
| 1 | Bonjour |
| 2 | UPnP |
| 3 | WS-Discovery |
| 4 | Wi-Fi Display |
| 5-254 | Reserved (Wi-Fi Docking added, Docking Discovery) |
| 255 | |

In Table 7, a service protocol type value related to a Wi-Fi docking service may be set to any one of 5 to 254 values. For example, when the service protocol type value is set to '5', it indicates that a service discovery request frame is transmitted to determined whether a Wi-Fi docking (docking discovery) is supported.

In another embodiment, in a Wi-Fi infrastructure, a MAC layer docking discovery procedure is performed by adding 'docking' to an advertisement protocol within a beacon.

However, the MAC layer docking discovery procedure in the Wi-Fi infrastructure is limited to a case of using an AP supporting IEEE 802.11u (GAS).

In a case in which an AP supporting IEEE 802.11u (GAS) is not used, an application layer docking discovery procedure is performed.

Table 8 below illustrates an example of a beacon frame body including 'docking' in an advertisement protocol.

TABLE 8

<Beacon frame body>

| Order | Information | Notes |
|---|---|---|
| 31 | Multiple BSSID | One or more Multiple BSSID elements are present if dot11RRMMeasurementPilotCapability is a value between 2 and 7 and the AP is a member of a Multiple BSSID Set (see 11.10.11) with two or more members, or if dot11MgmtOptionMultiBSSIDEnabled is true, or if dot11InterworkingServiceEnabled is true and the AP is a member of a Multiple BSSID Set with two or more members and the value of at least one dot11GASAdvertisementID is not null |
| 45 | Interworking | The Interworking element is present if dot11InterworkingServiceEnabled is true |
| 46 | Advertisement Protocol | Advertisement Protocol element is present if dot11InterworkingServiceEnabled is true and the value of at least one dot11GASAdvertisementID is not null |
| 47 | Roaming Consortium | The Roaming Consortium element is present if dot11InterworkingServiceEnabled is true and the dot11RoamingConsortiumTable has at least one not-null entry |
| 48 | Emergency Alert Identifier | One or more Emergency Alert Identifier elements are present if dot11EASEnabled is true and there are one or more EAS message(s) active in the network |

Figure 4D:
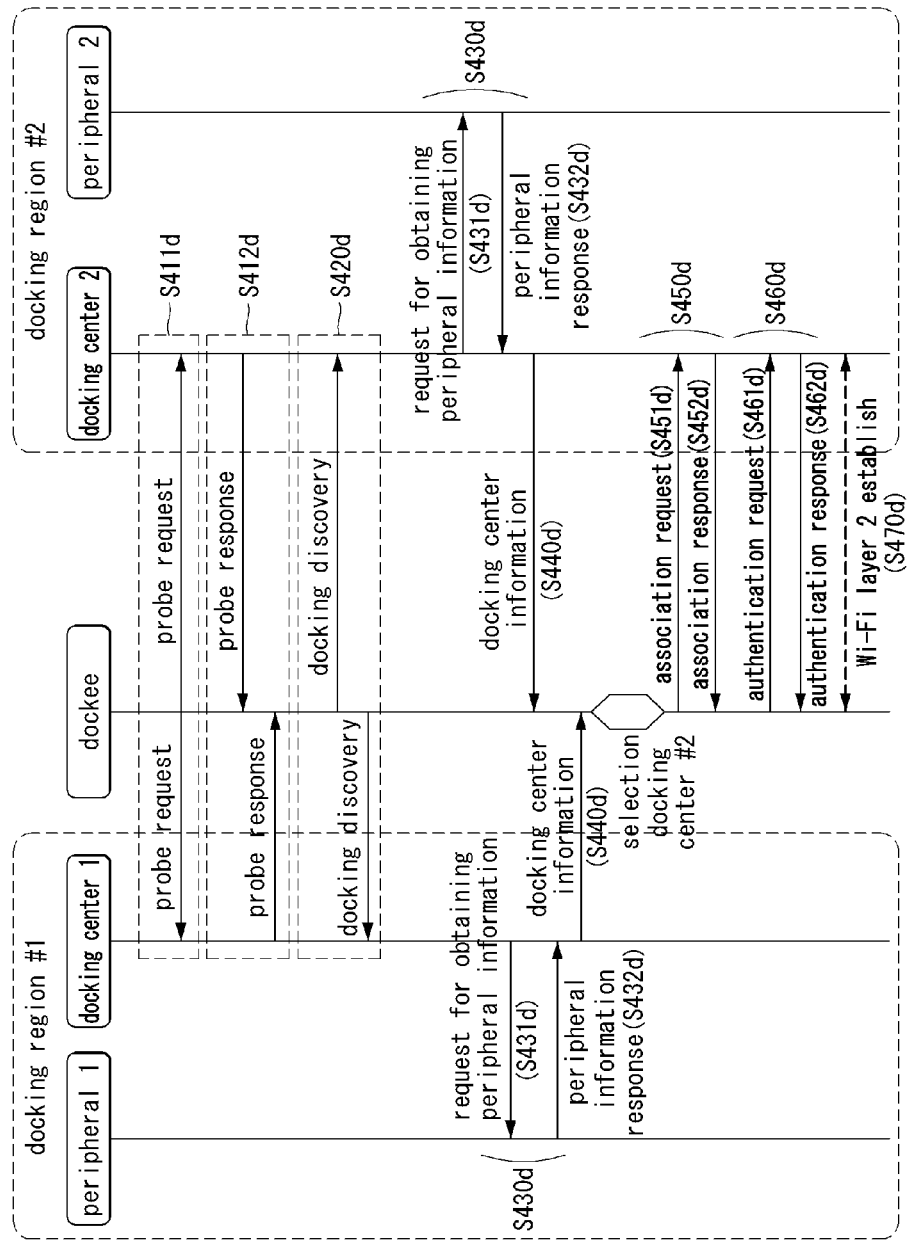
FIG. 4D is a flow chart illustrating another example of a MAC layer docking discovery procedure for performing a docking service using Wi-Fi proposed in the present disclosure.

FIG. 4D is a flow chart illustrating another example of a MAC layer docking discovery procedure for performing a docking service using Wi-Fi proposed in the present disclosure.

In FIG. 4D, it is assumed that two docking regions (docking region #1 and docking region #2) are present and the dockee docks to one of two docking regions.

In the docking region #1, a docking center 1 and a peripheral 1 dependent on (or subordinate to) the docking center 1 are present, and in the docking region #2, a docking center 2 and a peripheral 2 dependent on the docking center 2.

As illustrated in FIG. 4D, in order to search for a docking center present around the dockee, the dockee broadcasts a probe request to the docking center 1 and the docking center 2 (S411d).

Thereafter, upon receiving the probe request from the dockee, the docking center 1 and the docking center 2 transmit a response with respect to the probe request, namely, a probe response, to the dockee (S412d).

Thereafter, in order to recognize whether a docking service is supported, the dockee broadcasts docking discovery to the docking center 1 and the docking center 2 (S420d).

Thereafter, the docking center 1 and the docking center 2 transmit a peripheral information request (Get_Peripheral_Info) to the peripheral 1 and the peripheral 2 which can be connected thereto or which is dependent thereon in order to request information of the peripheral, respectively (S431d).

Thereafter, the peripheral 1 which has received the peripheral information request from the docking center 1 and the peripheral 2 which has received the peripheral information request from the docking center 2 transmit peripheral information response including detailed information thereof to the docking center 1 and the docking center 2, respectively (S432d).

Thereafter, the docking center 1 and the docking center 2 each transmit docking center information including information thereof to the dockee (S440d).

Thereafter, on the basis of the docking center information received from the docking center 1 and the docking center 2, the dockee selects a docking center to perform a docking service. In FIG. 4D, it can be seen that the docking center 2 is selected.

Thereafter, the dockee performs an association procedure with the docking center 2 (S450d).

The process of performing the association procedure and an authentication procedure with the docking center 2 is the same as steps S450a and S460a of FIG. 4A, and thus, a detailed description thereof will be omitted.

When step S460d is completed, a Wi-Fi layer 2 connection is established between the dockee and the docking center 2 (S470d).

Application Layer Docking Discovery

Hereinafter, an application layer docking discovery process will be described.

Wireless communication schemes used by the dockee and the docking center include various types of techniques, and in a case, the docking discovery function of the data link layer may not be performed according to a specific MAC technique.

In such a case, in the present disclosure, a docking discovery procedure, rather than the MAC docking discovery procedure, is performed.

Figure 5A:
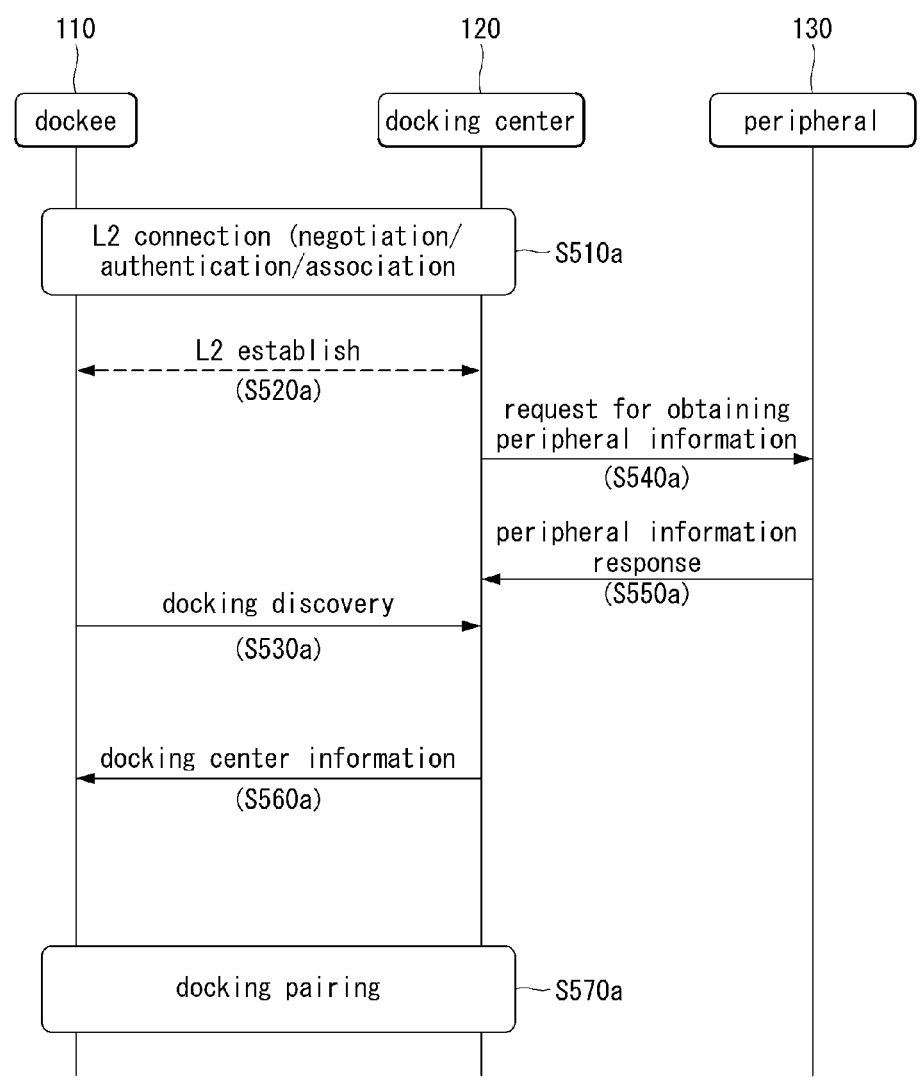
FIG. 5A is a flow chart illustrating an example of an application layer docking discovery procedure proposed in the present disclosure.

FIG. 5A is a flow chart illustrating an example of an application layer docking discovery procedure proposed in the present disclosure.

Docking discovery in the application layer is performed after a procedure for establishing a connection between data link layers of the dockee and the docking center.

As illustrated in FIG. 5A, the dockee and the docking center performs a negotiation procedure, an authentication procedure, and an association procedure for an L2 connection to thereby establish a Layer 2 connection between the dockee and the docking center (S520a).

Thereafter, in order to recognize whether a docking service is supported, the dockee transmits docking discovery to the Layer 2 connection-established docking center (S530a).

Here, the procedure for transmitting the docking discovery differs in an infrastructure environment and a direct-connection environment.

That is, in the infrastructure environment, the dockee transmits the docking discovery in a broadcast manner to every device available for direct communication with the dockee, and receives a response with respect to the docking discovery in a unicast manner to recognize information of a nearby docking center.

However, in the direct-connection environment, the dockee recognizes docking center information after performing all of connection establishment of the data link layer with every device available for connection.

Thereafter, the docking center transmits a peripheral information obtainment request to a peripheral dependent on the docking center (S540a).

Thereafter, the peripheral which has received the peripheral information obtainment request form the docking center transmits a peripheral information response including detailed peripheral information thereof, as a response thereto, to the docking center (S550a).

Thereafter, the docking center transmits the docking center information to the dockee (S560a).

Thereafter, the dockee and the docking center perform a docking pairing procedure (S570a).

Figure 5B:
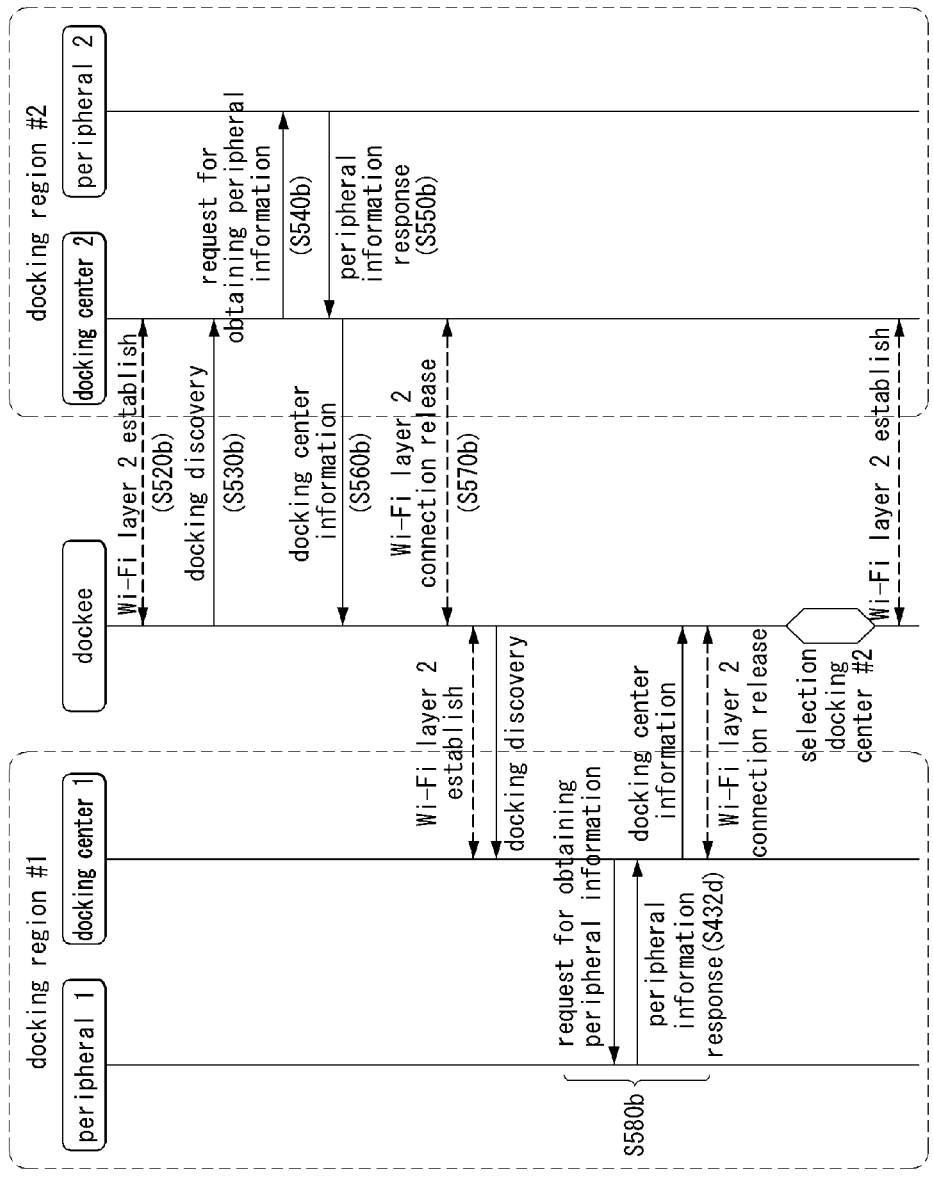
FIG. 5B is a flow chart illustrating another example of an application layer docking discovery procedure proposed in the present disclosure.

FIG. 5B is a flow chart illustrating another example of an application layer docking discovery procedure proposed in the present disclosure.

In FIG. 5B, it is illustrated that two docking regions (docking region #1 and docking region #2) are present and the dockee performs docking on one of two docking regions.

In the docking region #1, a docking center 1 and a peripheral 1 dependent on the docking center 1 are present, and in the docking region #2, a docking center 2 and a peripheral 2 dependent on the docking center 2.

First, the dockee establishes a Layer 2 connection with the docking center 2 present in the docking region 2 (S520b).

Thereafter, the dockee transmits docking discovery to the docking center 2 in order to recognize whether a docking service is supported (S530b).

Here, the procedure for transmitting the docking discovery differs in an infrastructure environment and in a direct-connection environment.

Referring to FIG. 5B, in the infrastructure environment, the dockee broadcasts docking discovery to the docking center 1 and the docking center 2, and receives a response with respect to the docking discovery from the docking center 1 and the docking center 2 in a unicast manner, separately, to recognize information of a nearby docking center.

However, in the direct-connection environment, the dockee recognizes information regarding the docking center 1 and the docking center 2 after performing all of connection establishments of the data link layer with the docking center 1 and the docking center 2.

Thereafter, the docking center 2 transmits peripheral information obtainment request to the peripheral 2 dependent on the docking center 2 (S540b).

Thereafter, the peripheral 2 transmits peripheral information response including detailed information of the peripheral 2, as a response with respect to the peripheral information obtainment request, to the docking center 2 (S550b).

Thereafter, the docking center 2 transmits docking center information to the dockee (S560b).

Thereafter, in a case in which the Wi-Fi Layer 2 connection between the dockee and the docking center 2 is released (S570b), the dockee performs Wi-Fi Layer 2 connection establishment procedure with the docking center 1 present in the docking region #1 (S580b).

Thereafter, a procedure performed between the dockee and the docking center 1 is the same as steps S520b to S570B, and thus, a detailed description thereof will be omitted.

Thereafter, when the Wi-Fi Layer 2 connection between the dockee and the docking center 1 is released, the dockee re-selects the docking center 2 so as to be supported with the docking service.

Thereafter, a procedure performed by the dockee with the docking center 2 is the same as steps S520b to S570b, and thus, a detailed description thereof will be omitted.

Docking Pairing

Hereinafter, a docking pairing procedure in a wireless docking system proposed in the present disclosure will be described.

A docking pairing procedure is a procedure for docking connection between a dockee and a docking center, which may also be expressed as a docking session connection procedure.

Figure 6A:
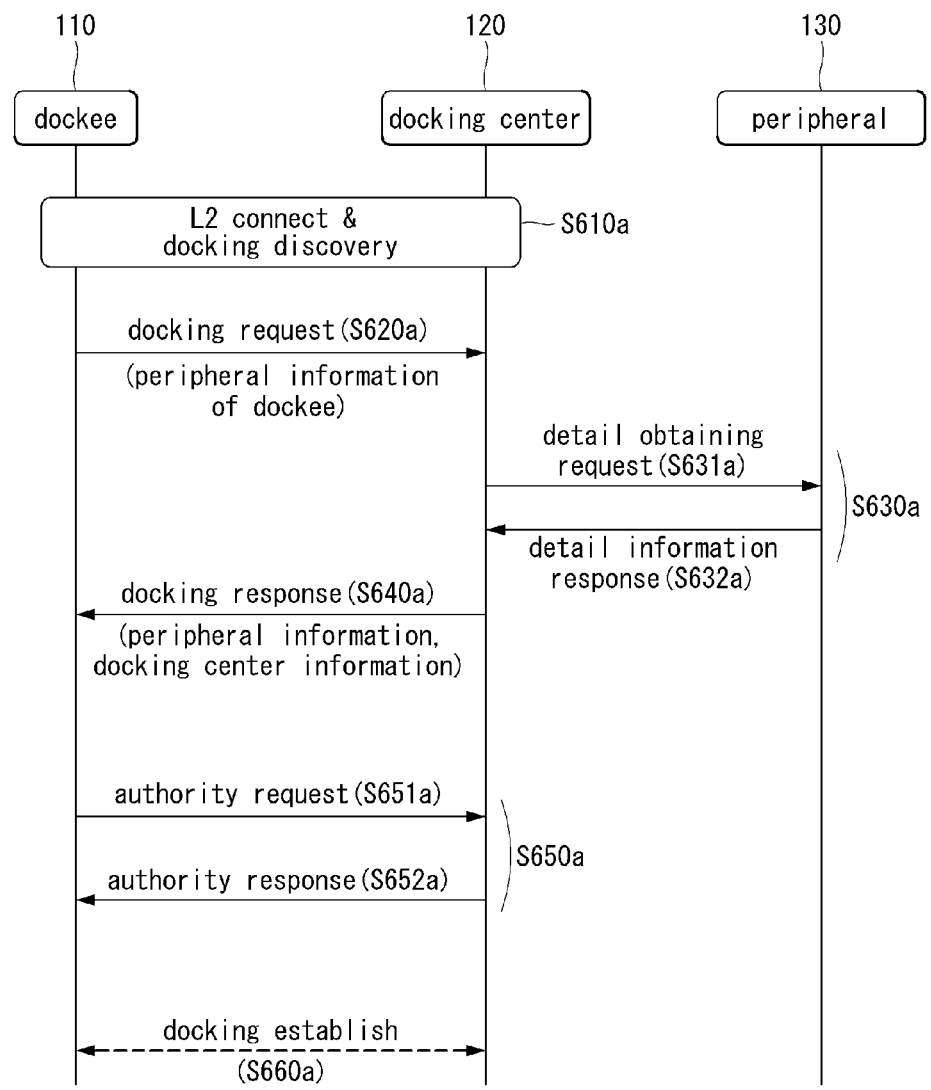
FIG. 6A is a flow chart illustrating an example of a docking pairing procedure in a wireless docking system proposed in the present disclosure.

FIG. 6A is a flow chart illustrating an example of a docking pairing procedure in a wireless docking system proposed in the present disclosure.

First, the dockee performs an L2 connection and a docking discovery procedure with the docking center (S610a).

Thereafter, the dockee selects a docking center to perform a docking service by a user or through different conditions. Here, the different conditions may be a proximity distance between the dockee and the docking center, signal strength of a searched docking center, and hardware capacity of a docking center.

Thereafter, for pairing with a selected docking center, the dockee transmits a docking request (Docking Req) to the dockey center in a unicast manner (S620a). The docking request includes information regarding a peripheral of the dockee.

The docking request includes information as illustrated in Table 9 below.

TABLE 9

<Docking_Req>

| Parameter | Type | Selective Value | Description |
|---|---|---|---|
| Docking_Center_ID | Unsigned Int | None | Docking Center ID value |
| Dockee_ID | Unsigned Int | None | Dockee_ID value |
| Dev_name | String | None | Dockee Device Name |
| Num_Peripheral | Unsigned Int | None | Number of supportable Peripheral |
| Peripheral_List | Structure Array (Peripheral_Info_t) | None | Detailed Information of Peripheral list |

In Table 9, the Dev name parameter denotes the name of a dockee (device), and the Num Peripheral parameter denotes the number of supportable peripherals or the number of peripheral functions able to perform a peripheral function by the dockee. The Peripheral_List parameter denotes detailed information of a peripheral list, details thereof will be referred to Table 10 below.

TABLE 10

<Peripheral_Info_t>

| Parameter | Type | Selective Value | Description |
|---|---|---|---|
| Peripheral_ID | Unsigned Int | None | Peripheral ID value |
| Dev_name | String | None | Device Name |
| Peripheral_Type | Enum | Mouse Keyboard Printer/ Scanner Display Home Automation ... | Usable Device Type |
| RW_Mode | Enum | Read Only Write Only Read/Write | RW mode for Peripheral |
| Display_Func | Boolean | Enable/ Disable | Ability for Display Function |
| Conn_Type | Enum | USB Bluetooth WiFi Serial Bus Wireless USB NFC ... | Connection Type to Docking Center |
| Condition | Boolean | Normal/Error | Peripheral Condition |
| Status | Enum | Able to be Preempted Sharable Fully Shared | Ability to accessible |
| Ordinal_Num | Unsigned Int | None | If (Status == 'Fully Shared') Ordinal Number in Queue |

In Table 10, the Conn_Type parameter denotes a connection type in which the peripheral is connected with a docking center, which may be a USB, Bluetooth, Wi-Fi Serial Bus, Wireless USB, or NFC according to set values. The Condition parameter denotes a state of a peripheral, which indicates normal or error according to values. The Status parameter denotes connectible capability and indicates preemption, share or complete share according to set values. The Ordinal_Num parameter denotes a general number in a queue when a state is 'complete share'.

Thereafter, the docking center performs a procedure for collecting a list of peripherals which can be controlled by the docking center or a list peripherals dependent on the docking center and detailed information of each peripheral, with the peripheral (S630a).

That is, the docking center transmits peripheral detailed information request (Get_Peri_Detail_Info) to the peripheral (S631a), and the peripheral transmits peripheral detailed information response message with respect to the peripheral detailed information request to the docking center (S632a).

The peripheral detailed information request includes information items illustrated in Table 11 below.

TABLE 11

<Get_Peri_Detail_Info>

| Parameter | Type | Selective Value | Description |
|---|---|---|---|
| Docking_Center_ID | Unsigned Int | None | Docking Center ID value |
| Peripheral_ID | Unsigned Int | None | Peripheral ID value |

Also, the peripheral detailed information response (Peri Detail Info) includes information items illustrated in Table 12 below.

TABLE 12

<Peri Detail Info>

| Parameter | Type | Selective Value | Description |
|---|---|---|---|
| Docking_Center_ID | Unsigned Int | None | Docking Center ID value |

TABLE 12-continued

<Peri Detail Info>

| Parameter | Type | Selective Value | Description |
|---|---|---|---|
| Num_Connected_Docking_Center | Unsigned Int | None | Number of connected Docking Center |
| Peripheral_Info | Peripheral_Info_t | None | Detailed Peripheral Information |

In Table 12, the Num_Connected_Docking_Center parameter denotes the number of connected cocking centers, and the Peripheral_Infor denotes detailed peripheral information. Details thereof may be referred to Table 10.

Thereafter, the docking center transmits a docking response (Docking_Rsp.) message including peripheral information and docking center information to the dockee (S640a).

The docking response (Docking_Rsp.) message includes information items illustrated in Table 13 below.

TABLE 13

<Docking_Rsp>

| Parameter | Type | Selective Value | Description |
|---|---|---|---|
| Dockee ID | Unsigned int | None | Dockee ID value |
| Docking Center ID | Unsigned int | None | Docking Center ID value |
| Dev name | String | None | Docking Center Device Name |
| Num Peripheral | Unsigned int | None | Number of supportable Peripheral |
| Peripheral List | Structure Array (Peripheral_Info_t) | None | Detailed Information of Peripheral list |

In Table 13, the Num Peripheral parameter denotes the number of supportable peripherals, and the Peripheral List Parameter denotes detailed information of a peripheral list. Details of the Peripheral List parameter may be referred to Table 10.

Thereafter, the dockee performs an authorization procedure 650a with the docking center to request transfer of authority to control a peripheral desired to be controlled by the dockee.

That is, the dockee transmits an authority request (Authority_Req.) including a list of at least one peripheral to the docking center (S651a).

The authority request (Authority_Req.) message includes information items as illustrated in Table 14 below.

TABLE 14

<Authority_Req.>

| Parameter | Type | Selective Value | Description |
|---|---|---|---|
| Docking_Center_ID | Unsigned Int | None | Docking Center ID value |
| Dockee_ID | Unsigned Int | None | Dockee ID value |
| Num_Peripheral | Unsigned Int | None | Number of Peripheral for control |
| Peripheral_List | Structure Array (Authority_Info_t) | None | Detailed Information of Peripheral list for control |

In Table 14, the Num_Peripheral parameter denotes the number of peripherals to be controlled, and the Peripheral_List parameter denotes detailed information of a peripheral list to be controlled. Details of the Peripheral_List parameter may be referred to Table 15 below.

TABLE 15

<Authority_Info_t>

| Parameter | Type | Selective Value | Description |
|---|---|---|---|
| Peripheral_ID | Unsigned Int | None | Docking Center ID value |
| Dev_name | String | None | Device Name |
| Peripheral_Type | Enum | Mouse Keyboard Printer/ Scanner Display Home Automation . . . | Usable Device Type(장치 종류) |
| RW_Mode | Enum | Read Only Write Only Read/Write | RW mode for Peripheral |
| Display_Func | Boolean | Enable/ Disable | Ability for Display Function |
| Authority_Type | Boolean | Preemption/ Share | Connection Type to Docking Center |

In Table 15, the RW_Mode parameter denotes a read/write mode of a peripheral, and only a read function, only a write function, or both read and write functions may be available according to set values. The Display_Func parameter denotes whether to perform a display function, and may be indicated to be available or unavailable according to set values. The Authority_Type parameter denotes a type connected to the docking center, and may be preemption or share according to set values.

Thereafter, the docking center checks the peripheral list received from the dockee, and transmits an authority response (Authority_Rsp.) message including whether each peripheral is permitted to the dockee (S652a).

The authority response (Authority_Rsp.) message includes information items illustrated in Table 16 below.

TABLE 16

<Authority_Rsp.>

| Parameter | Type | Selective Value | Description |
|---|---|---|---|
| Docking_Center_ID | Unsigned Int | None | Dockee ID value |
| Dockee_ID | Unsigned Int | None | Docking Center ID value |
| Num_Peripheral | Unsigned Int | None | Number of agreed Peripheral for control |
| Peripheral_List | Structure Array (Authority_Info_t) | None | Detailed Information of agreed Peripheral list for control |

In Table 16, the Num_Peripheral parameter denotes the number of peripherals permitted to be controlled, and the Peripheral_List parameter denotes detailed information of the peripheral list permitted to be controlled. Details of the Peripheral_List parameter may be referred to Table 15.

Thereafter, the dockee and the docking center are in a docking established, completing the docking pairing procedure (S660a).

Figure 6B:
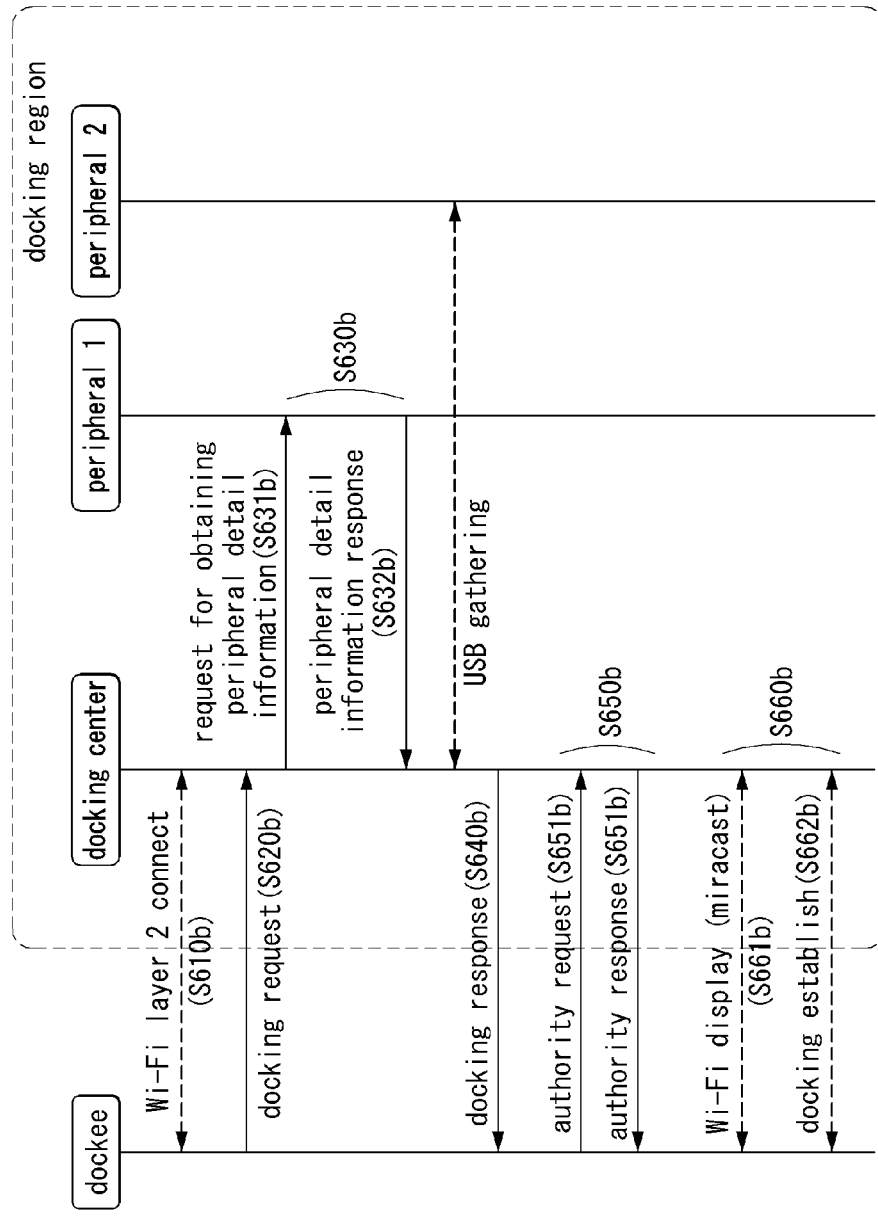
FIG. 6B is a flow chart illustrating another example of a docking pairing procedure in a wireless docking system proposed in the present disclosure.

FIG. 6B is a flow chart illustrating another example of a docking pairing procedure in a wireless docking system proposed in the present disclosure.

As illustrated in FIG. 6B, the docking center, the peripheral 1 and the peripheral 2 are present in the docking region.

The peripheral 1 and the peripheral 2 may be dependent on the docking center or may be controlled by the docking center. The peripheral 1 is a docking-dedicated peripheral, and the peripheral 2 is a USB.

First, the dockee establishes a Wi-Fi layer 2 connection establishment with the docking center (S610b).

Thereafter, for pairing with the docking center (that is, for a docking session connection), the dockee transmits a docking request to the docking center (S620b). The docking request includes peripheral information of the dockee.

Thereafter, the docking center performs a procedure for collecting detailed information of the peripheral 1 and the peripheral 2 with the peripheral 1 and the peripheral 2 (630b).

First, the docking center transmits peripheral detailed information obtainment request to the peripheral 1 (S631b), and the peripheral 1 transmits peripheral detailed information response message including detailed information thereof to the docking center, as a response to the peripheral detailed information obtainment request (S632b).

Also, the docking center receives detailed information regarding the peripheral 2 through a USB device gathering process with the peripheral 2. As the USB device gathering procedure, a USB standard technique is applied.

Thereafter, the docking center transmits a docking response message including information of the peripheral 1, the peripheral 2, and the docking center, to the dockee (S640b).

Thereafter, the dockee performs an authority procedure for transferring authority to control a peripheral with the docking center (S650b).

Thereafter, a Wi-Fi display (miracast) is initialized between the dockee and the docking center, and a docking connection is established (S660b).

Docking Operation

Hereinafter, a docking operation in the wireless docking system proposed in the present disclosure will be described in detail.

When the pairing procedure between the dockee and the docking center is completed in the wireless docking system, the dockee may be controlled by using peripherals paired based on the docking center, without directly controlling the dockee.

In the wireless docking system, the docking operation is managed in an event-driven manner or in a periodic manner.

First, the event-driven type docking operation in the wireless docking system will be described with reference to FIG. 7A.

Peripheral information generated due to manipulation of a peripheral such as a mouse or a keyboard is managed through the event-driven type docking operation. That is, when an event occurs in a peripheral, peripheral information of the generated event is transmitted to the dockee through the docking center.

Figure 7A:
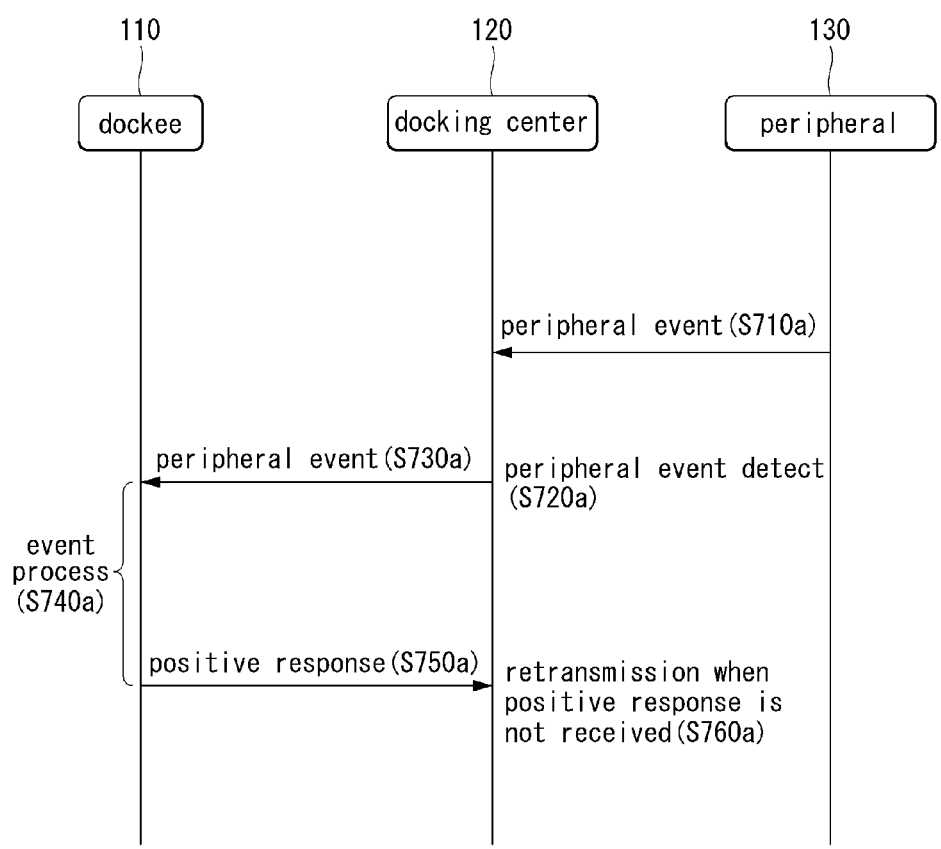
FIG. 7A is a flow chart illustrating an example of an event-driven type docking operation procedure.

FIG. 7A is a flow chart illustrating an example of an event-driven type docking operation procedure.

When an event occurs in a peripheral, the peripheral transmits a peripheral event (Peripheral_Event) message including the generated event information to the docking center (S710a).

The peripheral event (Peripheral_Event) message includes information items illustrated in Table 17 below.

TABLE 17

<Peripheral_Event>

| Parameter | Type | Selective Value | Description |
|---|---|---|---|
| Docking_Center_ID | Unsigned Int | None | Docking Center ID value |
| Num_Connected_Docking_Center | Unsigned Int | None | Number of connected Docking Center |
| Peripheral_Info | Peripheral_Info_t | None | Detailed Peripheral Information (See Table 10) |
| Action_Profile | USB_HID_t | None | HID Profile Data defined in USB |
| Data | Variable Length | None | Required data in addition to Peripheral Action Profile |

Thereafter, when the event of the peripheral is detected through the peripheral event message reception (S720a), the docking center transmits a peripheral event notification (Periphearl_Event_Noti.) message including the event information generated in the peripheral to the dockee (S730a).

The peripheral event message transmitted by the docking center to the dockee includes information items illustrated in Table 18 below.

TABLE 18

<Peripheral_Event_Noti.>

| Parameter | Type | Selective Value | Description |
|---|---|---|---|
| Dockee_ID | Unsigned Int | None | Dockee ID value |
| Docking_Center_ID | Unsigned Int | None | Docking Center ID value |
| Peripheral_Info | Peripheral_Info_t | None | Detailed Peripheral Information (See Appendix) |
| Action_Profile | USB_HID_t | None | HID Profile Data defined in USB |
| Data | Variable Length | None | Required data in addition to Peripheral Action Profile |

Thereafter, the dockee processes the corresponding event by using the peripheral event message (S740a), and transmits a positive acknowledgement (ACK) regarding the processed event to the docking center (S750a).

Here, in a case in which the docking center fails to receive the ACK during a predetermined period of time from the dockee, the docking center retransmits the peripheral event message to the dockee (S760a).

The number of retransmissions of the peripheral event message may be a maximum of 3 times or 5 times, but the present disclosure is not limited thereto.

Figure 7B:
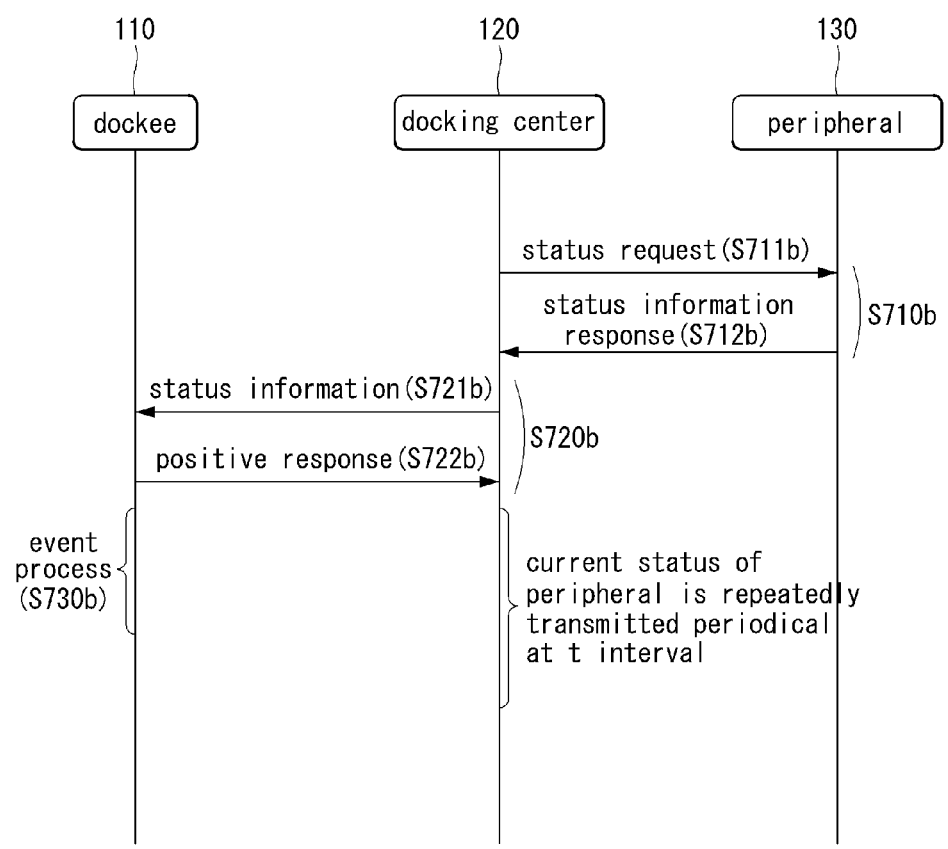
FIG. 7B is a flow chart illustrating an example of a periodic type docking operation procedure in a wireless docking system proposed in the present disclosure.

FIG. 7B is a flow chart illustrating an example of a periodic type docking operation procedure in a wireless docking system proposed in the present disclosure.

Unlike the event-driven type docking operation, the periodic type docking operation is that a docking center periodically informs the dockee about a current status of a peripheral.

A peripheral event occurring in real time may be solve in the event-driven manner, but in case of a peripheral in which an event has not occurred for a long period of time, it is difficult for the dockee to recognize current status information of the peripheral and past status information of the peripheral is not also reliable.

Thus, the docking center collects information of a peripheral dependent on the docking center from the corresponding peripheral and transmits the corresponding information to the dockee at a predetermined tine interval.

As illustrated in FIG. 7B, in order to request information regarding a current status of the peripheral, the docking center transmits a status request (Status_Req.) message to the peripheral (S711b).

The status request or the peripheral status request message includes information items illustrated in Table 19 below.

TABLE 19

<Status_Req or Peri_Status_Req.>

| Parameter | Type | Selective Value | Description |
|---|---|---|---|
| Docking_Center_ID | Unsigned Int | None | Docking Center ID value |
| Peripheral_ID | Unsigned Int | None | Peripheral ID value |

Thereafter, the peripheral transmits status information (Status_Info) message or status response (Status_Rsp.) message including its current status information to the docking center (S712b).

The status information or the status response message includes information items illustrated in Table 20 below.

TABLE 20

<Peri_Status_Info>

| Parameter | Type | Selective Value | Description |
|---|---|---|---|
| Docking_Center_ID | Unsigned Int | None | Docking Center ID value |
| Num_Connected_Docking_Center | Unsigned Int | None | Number of connected Docking Center |
| Peripheral_Info | Peripheral_Info_t | None | Detailed Peripheral Information (See Table 10) |
| Action_Profile | USB_HID_t | None | HID Profile Data defined in USB |
| Data | Variable Length | None | Required data in addition to Peripheral Action Profile |

In table 20, the Num_Connected_Docking_Center parameter denotes the number of connected docking center, the Peripheral_Info parameter denotes detailed peripheral information, and the Action_Profile parameter denotes data of an HID profile defined in the USB.

The Data parameter denotes required data in addition to the peripheral Action Profile parameter.

Thereafter, the docking center transmits the status information message received from the peripheral to the dockee (S721b).

The status information message transmitted to the dockee includes information items illustrated in Table 21 below.

TABLE 21

<Status_Info>

| Parameter | Type | Selective Value | Description |
|---|---|---|---|
| Dockee_ID | Unsigned Int | None | Dockee ID value |
| Docking_Center_ID | Unsigned Int | None | Docking Center ID value |

TABLE 21-continued

<Status_Info>

| Parameter | Type | Selective Value | Description |
| --- | --- | --- | --- |
| Num_Peripheral | Unsigned Int | None | Number of Peripheral for control |
| Peripheral_Info_List | Structure Array (Peripheral_Info_t) | None | Detailed Peripheral Information (See Table 10) |
| Action_Profile_List | Structure Array (USB_HID_t) | None | HID Profile Data defined in USB |
| Data_List | Data Array | None | Required data in addition to Peripheral Action Profile |

In Table 21, the Num_Peripheral parameter denotes the number of peripherals to be controlled, and the Peripheral_Info_List parameter denotes a detailed peripheral information list. Details may be referred to Table 10. The Action_Profile_List parameter denotes an HID Profile data List defined in a USB, and the Data_List parameter denotes required data List in addition to the Peripheral Action Profile.

Thereafter, the dockee transmits ACK as a positive acknowledgement with respect to the received status information message (S722b).

Thereafter, the dockee performs event processing using the received status information message (S730b). Here, event processing refers to a process of updating status information of a peripheral, and the event processing in the dockee is performed in the same manner as that of the event-driven scheme.

Also, the docking operation may be performed by the docking center on the basis of one selected from the event-driven scheme and the periodic scheme or on the basis of a mixture form thereof.

Figure 7C:
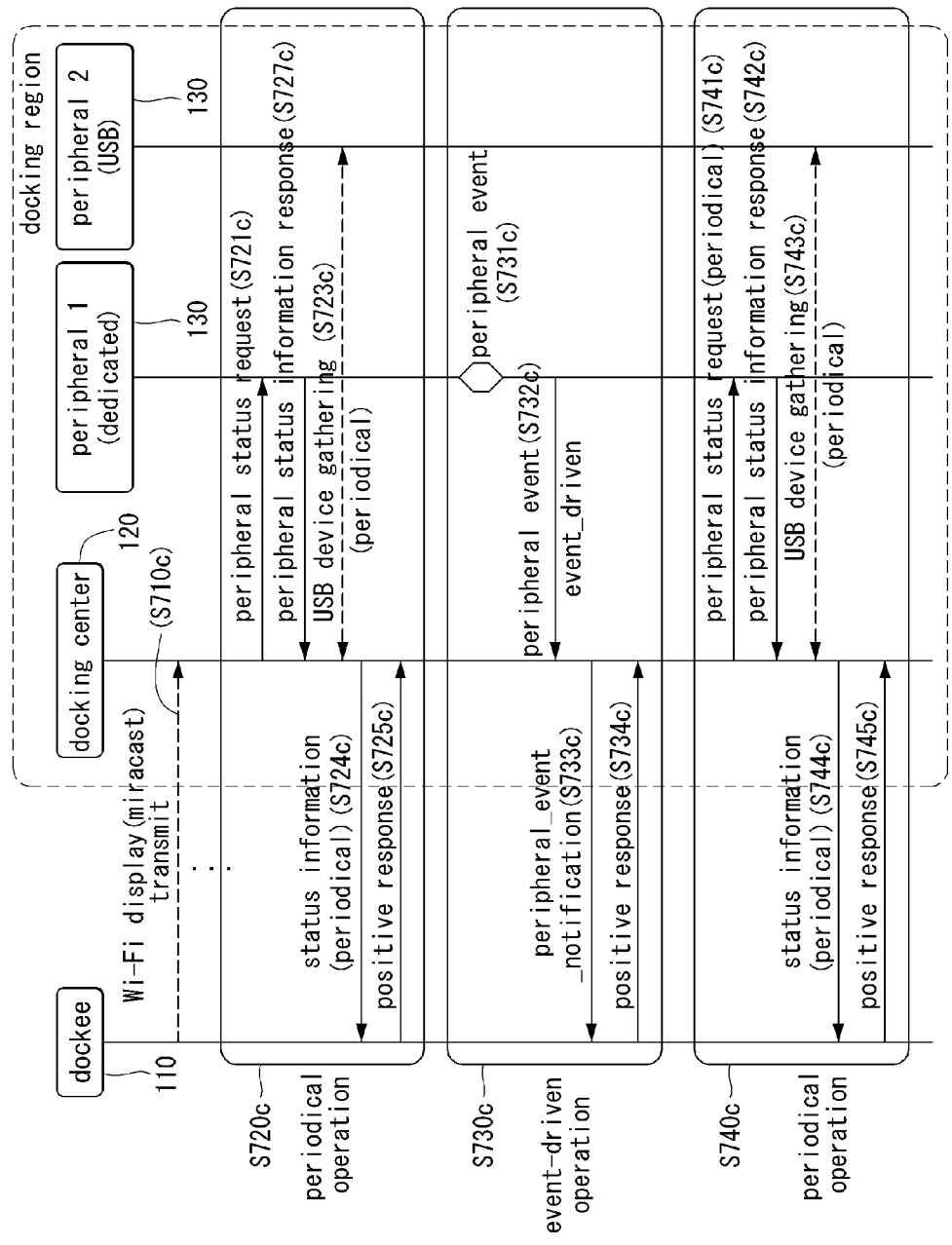
FIG. 7C is a flow chart illustrating an example of a docking operation procedure using both the event-driven scheme and the periodic scheme in a wireless docking system using Wi-Fi proposed in the present disclosure.

FIG. 7C is a flow chart illustrating an example of a docking operation procedure using both the event-driven scheme and the periodic scheme in a wireless docking system using Wi-Fi proposed in the present disclosure.

As illustrated in FIG. 7C, the docking center, the docking-dedicated peripheral 1 and a USB peripheral 2 are present in the docking region.

The dockee sends a Wi-Fi display (miracast) transmission to the docking center (S710c).

Here, the miracast refers to a technique of transmitting a screen by using Wi-Fi, that is, a technique based on which when a screen, a sound, data provided from a monitor or a speaker are compressed and transmitted by Wi-Fi, and a receiver decompresses the corresponding data and displays the same on a screen.

Thereafter, in order to inform the dockee about the status of the peripheral 1 and the peripheral 2, the docking center performs the periodic type docking operation procedure with the peripheral 1 and the peripheral 2 (S720c).

Steps S721c to S725c are the same as steps S710b to S730b of FIG. 7B, and thus, a detailed description thereof will be omitted.

Thereafter, when an event occurs in the peripheral 1, the docking center, the dockee, and the peripheral 1 perform the event-driven type docking operation procedure (S730c).

That is, when the peripheral 1 detects occurrence of a event (S731c), the peripheral 1 transmits a peripheral event (Peripheral_Event) message including the generated event information to the docking center (S732c). Also, the docking center transmits a peripheral event notification (Peripheral_Event_Noti.) message indicating that the event has occurred in the peripheral 1 to the dockee (S733c). On the basis of the received peripheral event notification message, the dockee performs event processing and transmits an ACK as a response to the peripheral event notification message (S734c).

When an event does not occur during a predetermined period of time, the period type docking operation procedure of step S720c is performed (S740c).

Figure 7D:
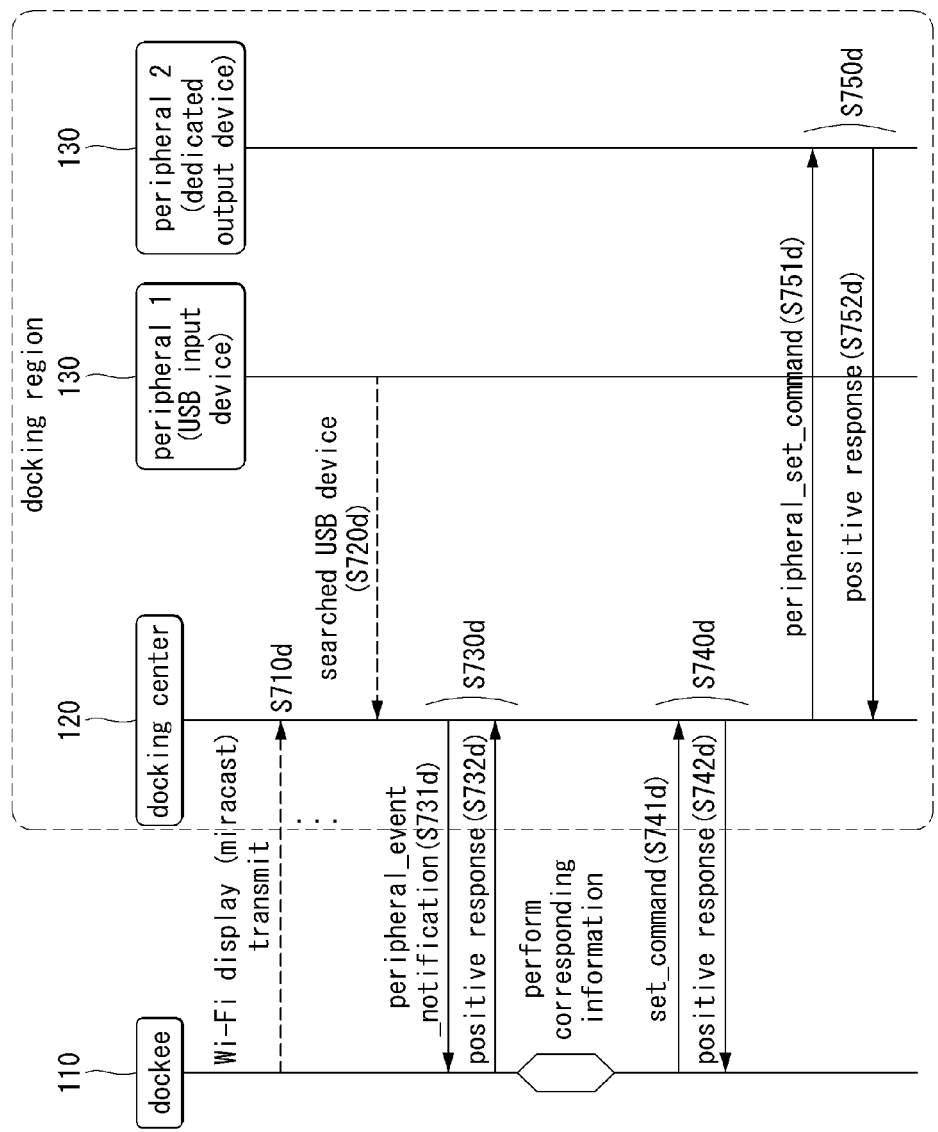
FIG. 7D is a flow chart illustrating an example of a docking operation procedure according to a user command in a wireless docking system using Wi-Fi proposed in the present disclosure.

FIG. 7D is a flow chart illustrating an example of a docking operation procedure according to a user command in a wireless docking system using Wi-Fi proposed in the present disclosure.

Here, the docking operation procedure according to a user command refers to outputting to an output device by using an input device.

As illustrated in FIG. 7D, the docking center, the peripheral 1 as a USB input device, and the peripheral 2 as a dedicated output device are present in the docking region.

The dockee sends a Wi-Fi display (miracast) transmission to the docking center (S710d).

Thereafter, when information indicating that the USB device as the peripheral 1 has been detected is received from the peripheral 1, the docking center transmits a peripheral event notification (Peripheral_Event_Noti.) message indicating that the peripheral 1 has been detected, to the dockee (S731d).

Thereafter, the dockee transmits an ACK as a response to the peripheral event notification message to the docking center (S732d).

Thereafter, when the dockee receives a user command, the dockee transmits a set command (Set_Command) message including the received command to the docking center (S741d).

The set command (Set_Command) message transmitted from the dockee to the docking center includes information items illustrated in Table 22 below.

TABLE 22

<Set_Command>

| Parameter | Type | Selective Value | Description |
| --- | --- | --- | --- |
| Dockee_ID | Unsigned Int | None | Dockee ID value |
| Docking_Center_ID | Unsigned Int | None | Docking Center ID value |
| Peripheral_Info | Peripheral_Info_t | None | Detailed Peripheral Information (See Table 10) |
| Action_Profile | USB_HID_t | None | HID Profile Data defined in USB |
| Data | Variable Length | None | Required data in addition to Peripheral Action Profile |

Thereafter, the docking center transmits an ACK, as a response to the set command message, to the dockee (S742d).

Thereafter, on the basis of the received set command message, the docking center transmits a peripheral set command (Peri_Set_Command) message to the peripheral 2 (S751d).

The peripheral set command (Peri_Set_Command) message transmitted from the docking center to the peripheral includes information items illustrated in Table 23 below.

TABLE 23

<Peri_Set_Command>

| Parameter | Type | Selective Value | Description |
|---|---|---|---|
| Dockee_ID | Unsigned Int | None | Dockee ID value |
| Docking_Center_ID | Unsigned Int | None | Docking Center ID value |
| Peripheral_Info | Peripheral_Info_t | None | Detailed Peripheral Information (See Appendix) |
| Action_Profile | USB_HID_t | None | HID Profile Data defined in USB |
| Data | Variable Length | None | Required data in addition to Peripheral Action Profile |

Thereafter, the peripheral 2 transmits an ACK, as a response to the peripheral set command message, to the docking center (S752d).

Docking Closing

Hereinafter, a docking closing procedure in the wireless docking system proposed in the present disclosure will be described in detail.

The docking closing procedure includes two types of docking closing, that is, docking closing based on a user request and docking closing based on time-out.

First, the docking closing procedure based on a user request will be described with reference to FIG. 8A.

Figure 8A:
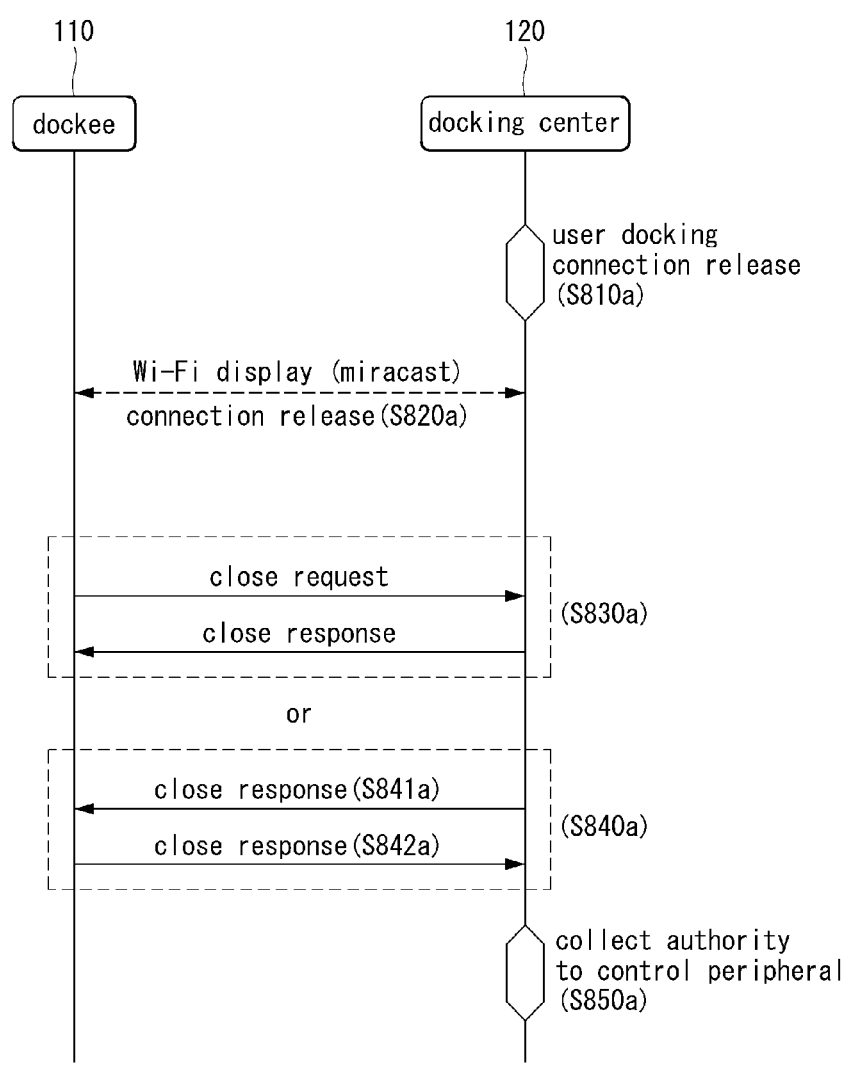
FIG. 8A is a flow chart illustrating an example of a docking closing procedure according to a user request.

FIG. 8A is a flow chart illustrating an example of a docking closing procedure based on a user request.

As illustrated in FIG. 8A, the docking closing procedure based on a user request may be started by the dockee or by the docking center.

The docking center or the dockee receives a docking connection release from the user (S810a), the docking center performs Wi-Fi display (miracast) connection release with the dockee (S820a).

Thereafter, the dockee and the docking center perform the docking service usage termination procedure. First, a case in which the dockee requests usage closing from the docking center will be described.

The dockee transmits a close request (Close_Req) message for closing the docking service usage to the docking center (S830a).

Then, the docking center transmits a close response (Close_Req) message, as a response to the close request message, to the dockee (S830a).

Next, a case in which the docking center requests usage closing from the dockee will be described.

The docking center transmits a close request (Close_Req) message for closing docking usage to the dockee (S840a).

Then, the dockee transmits a close response (Close_Rsp) message, as a response to the closing request, to the docking center (S840a).

Thereafter, the docking center collects the authority to control the peripheral from the dockee (S850a).

The close request (Close_Req.) message transmitted from the docking center to the dockee or from the dockee to the docking center includes information items illustrated in Table 24 below.

TABLE 24

<Close_Req.>

| Parameter | Type | Selective Value | Description |
|---|---|---|---|
| Dockee_ID | Unsigned Int | None | Dockee ID value |
| Docking_Center_ID | Unsigned Int | None | Docking Center ID value |

Also, the close response (Close_Rsp.) message transmitted from the docking center to the dockee or from the dockee to the docking center includes information items illustrated in Table 25 below.

TABLE 25

<Close_Rsp.>

| Parameter | Type | Selective Value | Description |
|---|---|---|---|
| Dockee_ID | Unsigned Int | None | Dockee ID value |
| Docking_Center_ID | Unsigned Int | None | Docking Center ID value |

Figure 8B:
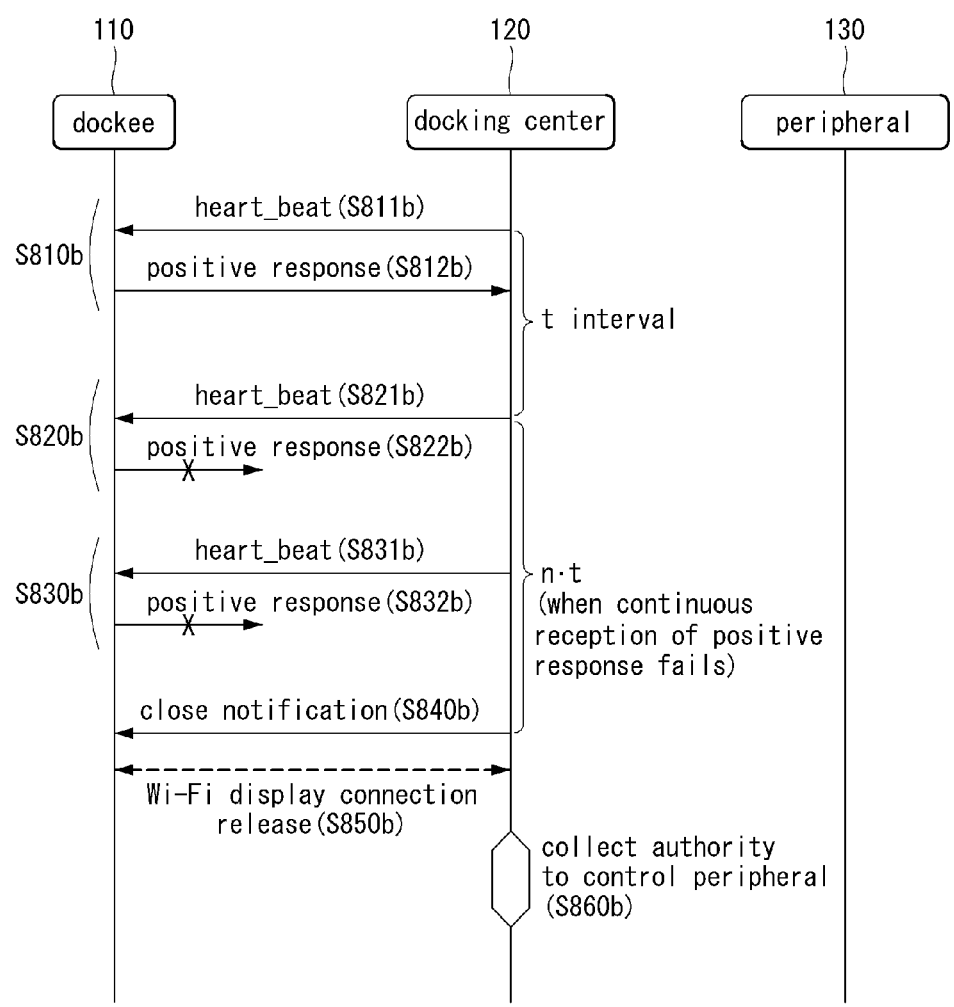
FIG. 8B is a flow chart illustrating an example of a docking closing procedure based on time-out.

FIG. 8B is a flow chart illustrating an example of a docking closing procedure based on time-out.

In some cases, the dockee and the docking center paired in the wireless docking system may need to close the docking connection due to an inevitable cause such as communication interruption, or the like.

In this case, the docking center should collect the authority to control the peripheral given to the dockee and prepare paring with another dockee.

In order to perform such a function, a method for periodically checking whether a connection between the docking center and the dockee is maintained is required.

Thus, in the present disclosure, a method for exchanging a heart beat (Heart_beat) message for periodically checking whether a connection between the docking center and the dockee is maintained is provided.

For example, as illustrated in FIG. 8B, the docking center continuously transmits a heat_beat (Heart_beat) message for periodically checking whether a connection between the docking center and the dockee is maintained to the dockee at a predetermined time interval by a preset number of times (n) (S811b).

The heart beat (Heart_Beat) message includes information items illustrated in Table 26 below.

TABLE 26

<Heart_Beat>

| Parameter | Type | Selective Value | Description |
| --- | --- | --- | --- |
| Dockee_ID | Unsigned Int | None | Dockee ID value |
| Docking_Center_ID | Unsigned Int | None | Docking Center ID value |

In FIG. 8B, the preset number of times is set to 3 times, but this is merely an example and the number of may be flexibly set to twice, four times, or five times according to system environments.

Also, preferably, the predetermined time interval is set to 1 second, but this value may also be flexibly set according to system environments.

Thereafter, the dockee transmits an ACK to the docking center, as a response with respect to the heart bit message (S812b).

Here, in a case in which the docking center does not receive any one ACK with respect to heart beat messages which have been transmitted to the dockee, from the dockee, the docking center determines that communication with the dockee is interrupted and transmits a close notification (Close_Notification) message for releasing docking connection, to the dockee (S820b to S840b).

The close notification (Close_Notification) message includes information items illustrated in Table 27 below.

TABLE 27

<Close_Notification>

| Parameter | Type | Selective Value | Description |
| --- | --- | --- | --- |
| Dockee_ID | Unsigned Int | None | Dockee ID value |
| Docking_Center_ID | Unsigned Int | None | Docking Center ID value |

Here, the close notification message is transmitted from the docking center over a possibility that the dockee will be able to receive the message.

When the docking center transmits the close notification message, the Wi-Fi display between the dockee and the docking center is released from connection (S850b).

Thereafter, the docking center collects the authority to control the peripheral which has been transferred to the dockee, from the dockee (S860b).

FIG. 8B illustrates a case in which the heart beat (Heart_beat) message for periodically checking whether a connection between the docking center and the dockee is maintained is transmitted by the docking center, but this is merely an example, and in order to periodically check whether a connection between the docking center and the dockee is maintained, the heart beat message may be transmitted by the dockee and the docking center may transmit a response thereto.

Hereinafter, a dedicated peripheral interface proposed in the present disclosure will be described in detail.

In the wireless docking system, the docking center uses a standard interface such as a USB or Bluetooth.

However, in a case in which there is a request for using only a peripheral without connection to the docking center and the dockey, such as a lighting system or home automation, in the wireless docking system, a separate interface for docking between the docking center and the peripheral is required.

Thus, a communication interface between the docking center and a docking-dedicated peripheral is defined.

Figure 9A:
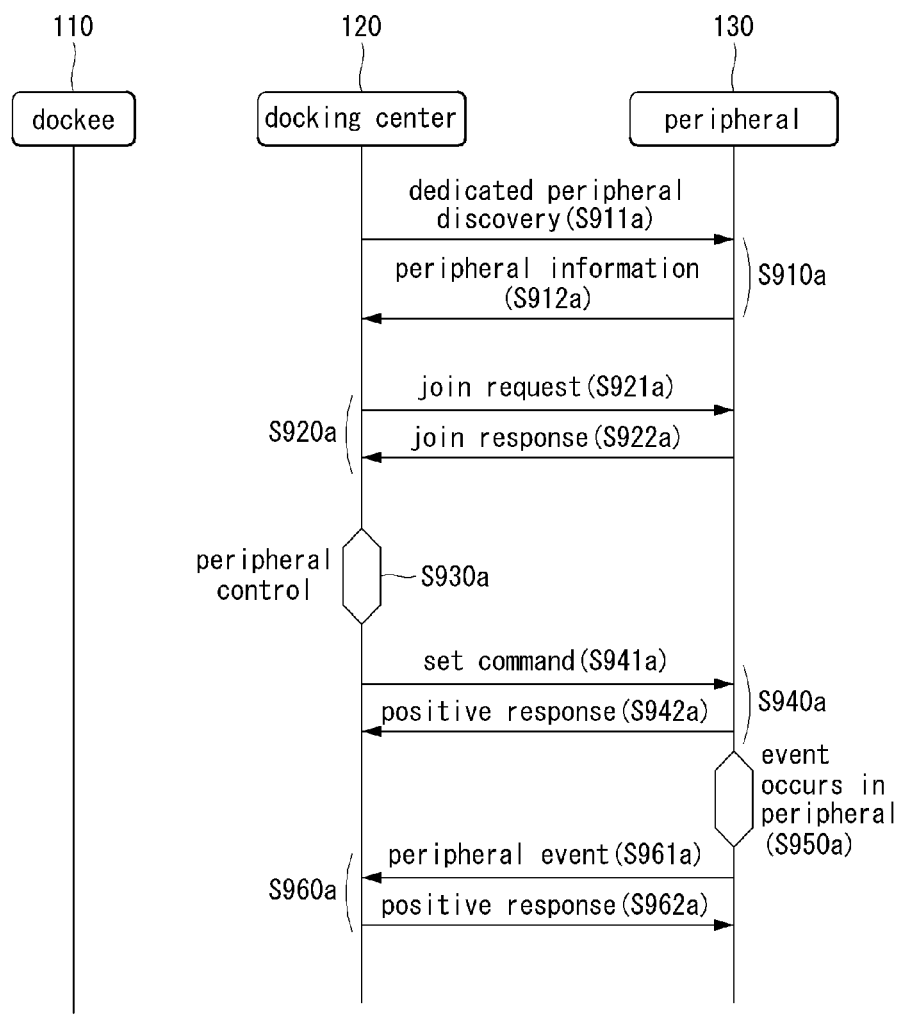
FIG. 9A is a flow chart illustrating an example of a communication procedure between a docking center and a docking-dedicated peripheral proposed in the present disclosure.

FIG. 9A is a flow chart illustrating an example of a communication procedure between a docking center and a docking-dedicated peripheral proposed in the present disclosure.

First, in order to recognize a dedicated peripheral present nearby (or in proximity, in the vicinity, or within a close distance), the docking center broadcasts a dedicated peripheral discovery (Dedicated_Peri_Discovery) message (S911a).

The dedicated peripheral discovery message includes information items illustrated in Table 28 below.

TABLE 28

<Dedicated_Peri_Discovery>

| Parameter | Type | Selective Value | Description |
| --- | --- | --- | --- |
| Docking_Center_ID | Unsigned Int | None | Docking Center ID value |

Thereafter, when a dedicated peripheral receives the dedicated peripheral discovery message, the dedicated peripheral transmits peripheral information (Peripheral_Info) message including device information thereof to the docking center (S912a).

The peripheral information message includes information items illustrated in Table 29 below.

TABLE 29

<Peripheral_Info>

| Parameter | Type | Selective Value | Description |
| --- | --- | --- | --- |
| Docking_Center_ID | Unsigned Int | None | Docking Center ID value |
| Peripheral_Info | Peripheral_Info_t | None | Detailed Peripheral Information (See Table 10) |

Thereafter, on the basis of the peripheral information message received from the dedicated peripheral, the docking center selects a dedicated peripheral which is required to become dependent on the wireless docking system or which is required to be included in the wireless docking system.

Thereafter, the docking center performs a joining procedure or docking with the selected peripheral (S920a), thus completing a dedicated peripheral registration procedure with the peripheral.

In the joining procedure, the docking center transmits a join request (Join_Req.) message to the selected peripheral (S921a), and the selected peripheral transmits a join response (Join_Rsp.) message to the docking center, as a response to the join request message (S922a).

The join request (Join_Req.) message includes information items illustrated in Table 30 below.

TABLE 30

| Parameter | Type | Selective Value | Description |
|---|---|---|---|
| Peripheral_Info | Unsigned Int | None | Docking Center ID value |
| Docking_Center_ID | Unsigned Int | None | Docking Center ID value |

<Join_Req.>

Also, the join response (Join_Rsp.) message includes information items illustrated in Table 31 below.

TABLE 31

| Parameter | Type | Selective Value | Description |
|---|---|---|---|
| Docking_Center_ID | Unsigned Int | None | Docking Center ID value |
| Peripheral_ID | Unsigned Int | None | Docking Center ID value |

<Join_Rsp.>

In this manner, the docking center controls the peripheral (S930a).

Thereafter, in a case in which the dedicated peripheral is an output device which needs to be controlled, the docking center transmits a set command (Set_Command) message to the dedicated peripheral (S941a).

In this case, the dedicated peripheral transmits an ACK as a response to the set command message, to the docking center (S942a).

Also, in a case in which the dedicated peripheral is an input device which needs to be controlled, when an event occurs in the dedicated peripheral, the dedicated peripheral transmits a peripheral event (Peripheral_Event) message including the generated event information to the docking center (S961a).

In this case, the docking center transmits an ACK, as a response to the peripheral event message, to the dedicated peripheral (S962a).

Figure 9B:
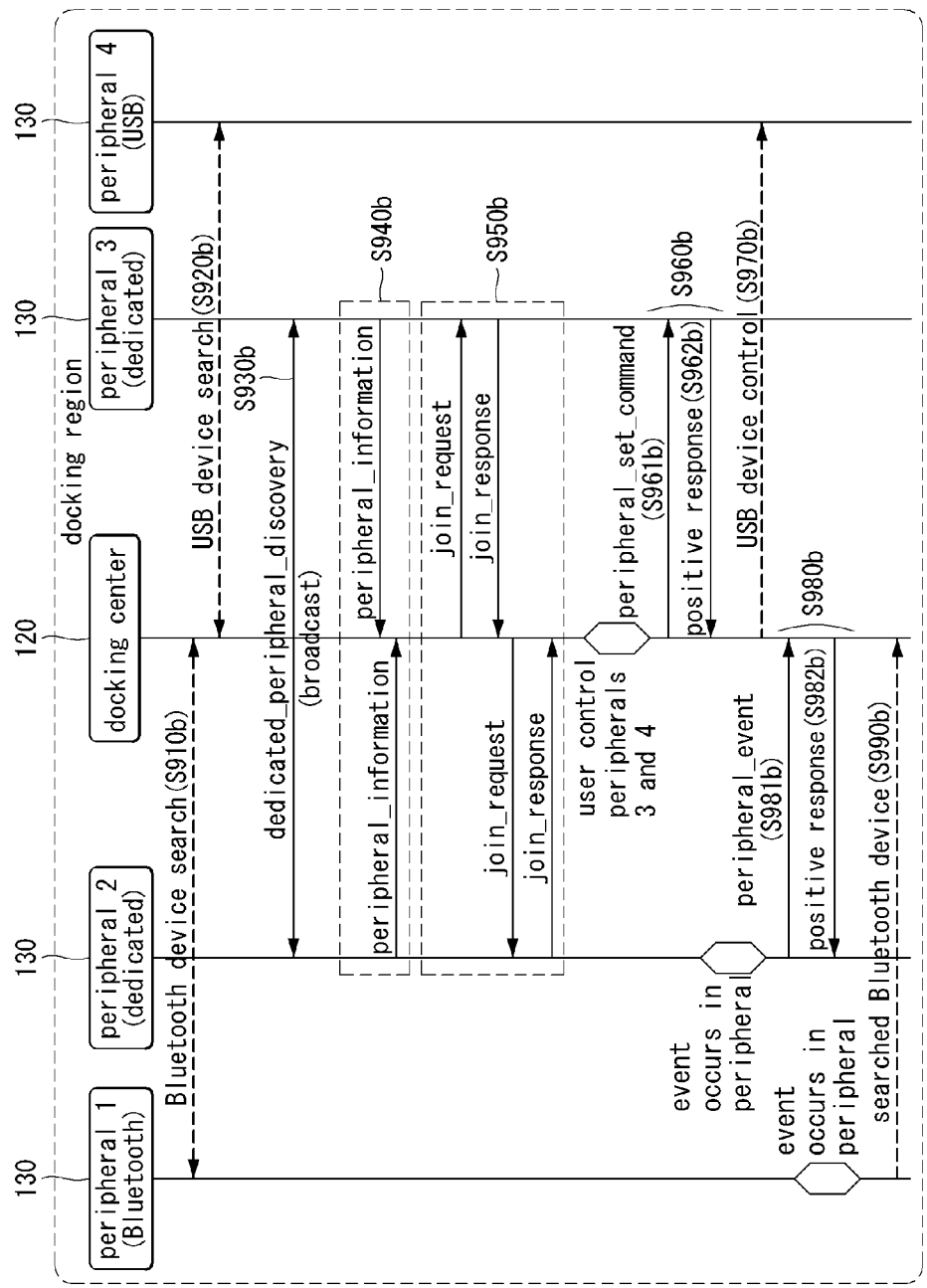
FIG. 9B is a flow chart illustrating another example of a communication procedure between a docking center and a docking-dedicated peripheral proposed in the present disclosure.

FIG. 9B is a flow chart illustrating another example of a communication procedure between a docking center and a docking-dedicated peripheral proposed in the present disclosure.

FIG. 9B illustrates a procedure for defining an interface between the docking center and the docking dedicated peripheral in the wireless docking system using Wi-Fi.

As illustrated in FIG. 9B, the docking center, the peripheral 1 available for Bluetooth communication, docking-dedicated peripheral 2 and peripheral 3, and a peripheral available for USB communication are present in the docking region.

First, the docking center performs a Bluetooth device search procedure with the peripheral 1 (S910b), and performs a USB device search procedure with the peripheral 4 (S920b).

Thereafter, the docking center broadcasts a dedicated peripheral discovery (Dedicated_Peri_Discovery) message to the dedicated peripherals 2 and 3 (S930b).

Thereafter, the dedicated peripherals 2 and 3 each transmit a peripheral information (Peripheral_Info) message including each peripheral device information, as response to the dedicated peripheral discovery message, to the docking center (S940b).

Thereafter, on the basis of the peripheral information message received from the dedicated peripherals 2 and 3, the docking center selects a dedicated peripheral which needs to be dependent on the wireless docking system or which needs to be included therein.

Thereafter, the docking center performs a joining procedure with the dedicated peripherals 2 and 3 (S950b), thus completing a dedicated peripheral registration procedure with the dedicated peripherals 2 and 3.

The joining procedure for the docking center with the dedicated peripherals 2 and 3 is the same as the step S920a of FIG. 9A, and thus, a detailed description thereof will be omitted.

Thereafter, when the docking center receives a user request regarding control of the peripherals 3 and 4, the docking center transmits a set command (Set_Command) message to the peripheral 3 (S961b) and transmits a USB device control message for controlling a USB device to the peripheral 4 (S970b).

Here, the dedicated peripheral 3 transmits an ACK, as a response to the set command message, to the docking center (S962b).

Also, when an event occurs in the dedicated peripheral 2, the dedicated peripheral 2 transmits a peripheral event (Peripheral_Event) message including the generated event information to the docking center (S981b).

In this case, the docking center transmits an ACK to the peripheral 2, as a response with respect to the peripheral event message (S982b).

Also, when an event occurs in the dedicated peripheral 1, the peripheral 1 informs the docking center that the Bluetooth device has been searched (S990b).

Hereinafter, a user interface (UI) related to the docking discovery process proposed in the present disclosure will be described in detail.

A UI related to the wireless docking system is mainly generated in the dockee, and the UI is divided into a UI related to a docking center discovery procedure and a UI related to a pairing procedure.

Figure 10:
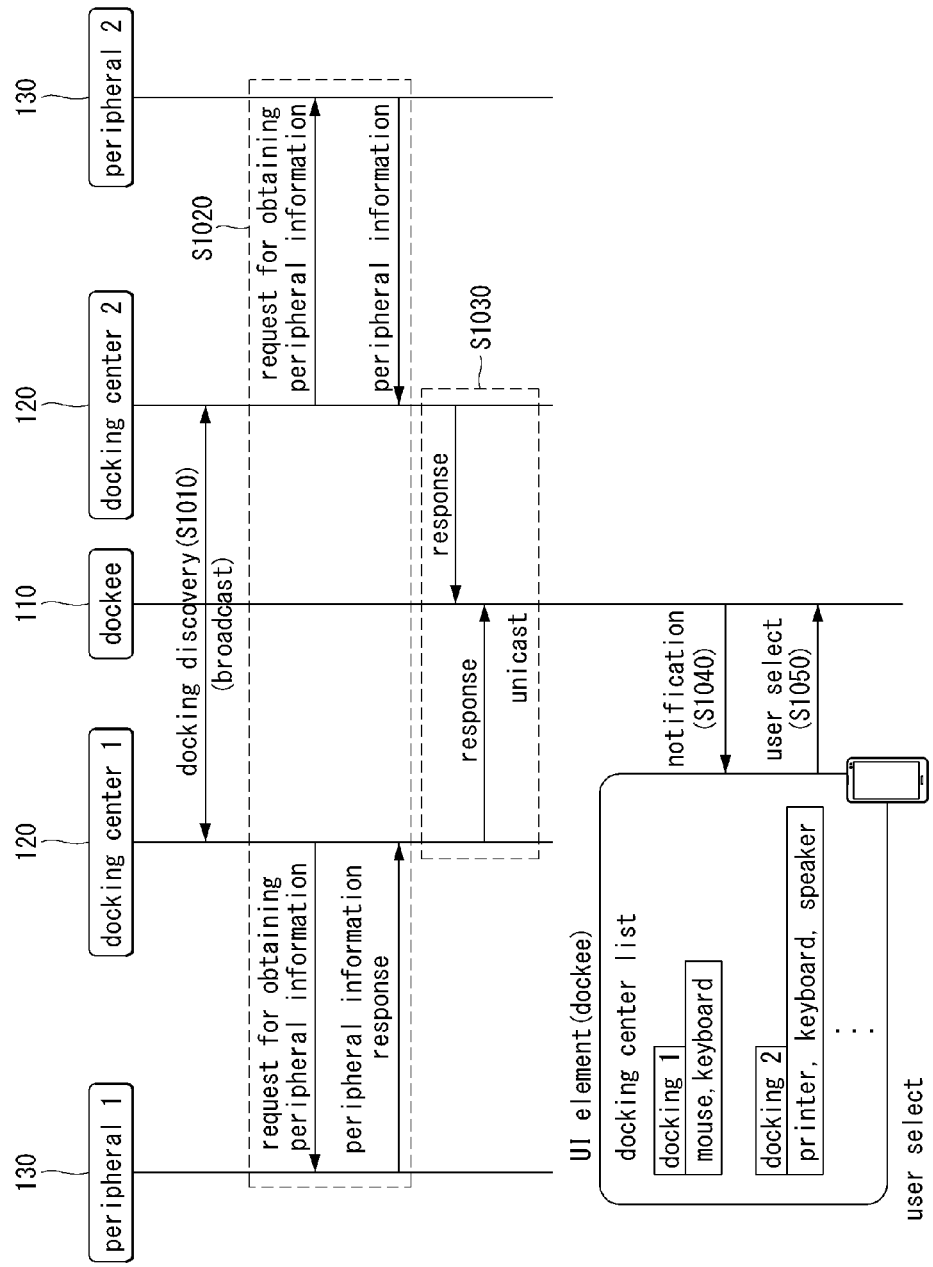
FIG. 10 is a view illustrating an example of a user interface related to a docking discovery procedure proposed in the present disclosure.

FIG. 10 is a view illustrating an example of a user interface related to a docking discovery procedure proposed in the present disclosure.

As illustrated in FIG. 10, when each docking center information and information of a peripheral dependent on each docking center are received from the docking center 1 and the docking center 2 through a docking discovery procedure (MAC layer or application layer), the dockee displays the received information through an output unit thereof (S1010 to S1030).

Detailed descriptions of steps S1010 to S1030 may be referred to FIGS. 4A through 5B.

As illustrated in FIG. 10, the information (S1040) displayed through the output unit of the dockee includes a docking center list in a searched neighbor environment and a list of peripherals controlled in each docking center. A docking center 1 and a docking center 2 are displayed in the docking center list. A mouse and a keyboard controlled in the docking center 1 are displayed in the peripheral list, and a printer, a keyboard, and a speaker are displayed as peripherals controlled in the docking center 2.

Here, a detail level of the peripheral information displayed on the UI screen of the dockee may be selectively provided by the user.

That is, detailed information of a peripheral may be processed to a summary form so as to be displayed, or the entirety of detailed information of a peripheral may be displayed at a time.

Also, the detailed information of the peripheral may be displayed together with the docking center list and the peripheral list on the same screen, or when a corresponding peripheral is clicked on the displayed peripheral list, detailed information of the corresponding peripheral may be displayed.

Thereafter, when an input for selecting any one docking center by the user in the UI screen of the dockee is received (S1050), the dockee performs a pairing procedure with the selected docking center.

Figure 11:
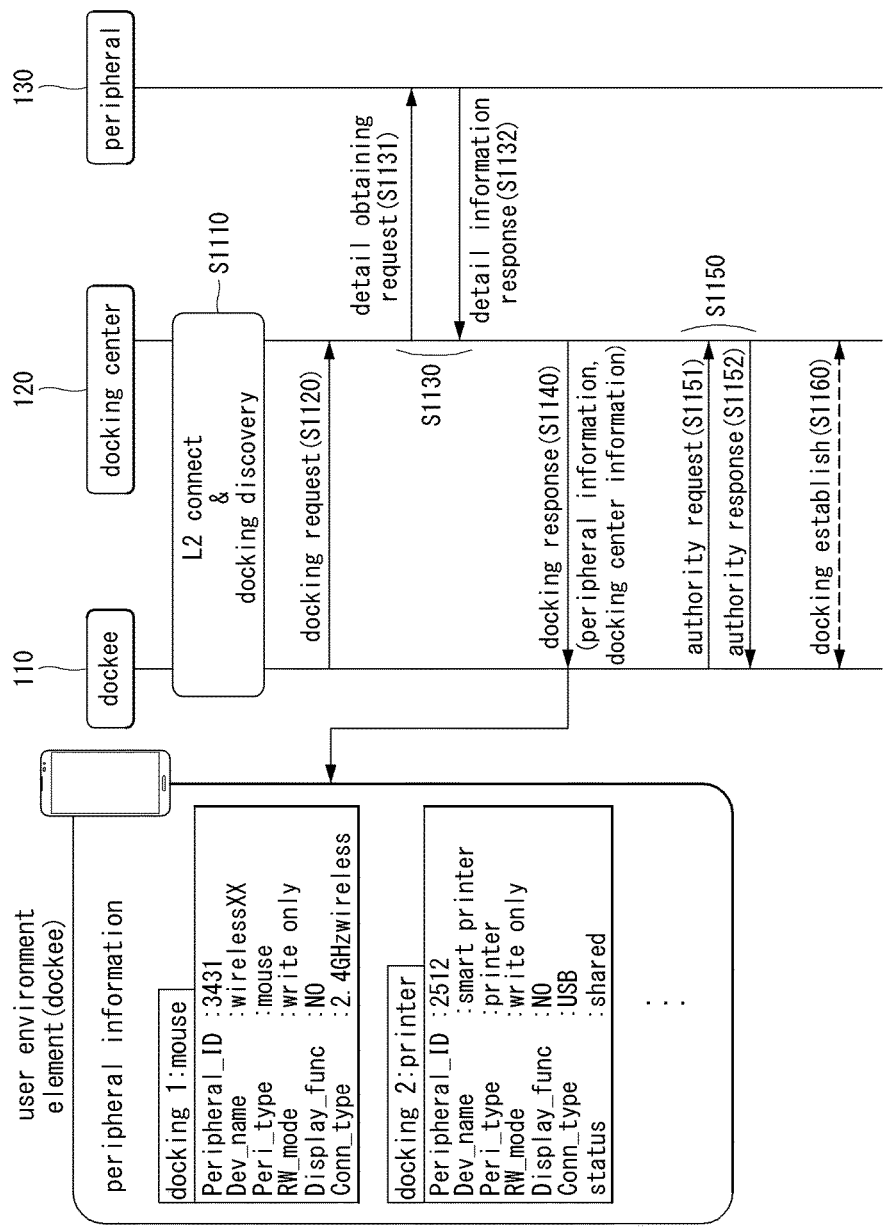
FIG. 11 is a view illustrating an example of a user interface related to a docking pairing procedure proposed in the present disclosure.

FIG. 11 is a view illustrating an example of a user interface related to a docking pairing procedure proposed in the present disclosure.

In the pairing procedure of the dockee and the docking center, detailed information regarding peripherals available to be used by the dockee is displayed.

In the detailed information regarding the peripherals, a physical or logical interface between the peripheral and the docking center may also be displayed together, and an attribute of each peripheral regarding whether input/output is available and whether each peripheral can be shared with other system are also displayed together.

As illustrated in FIG. 11, when the dockee receives a docking response message including information of a peripheral dependent on the docking center and the docking center information, the dockee displays detailed information of the periphery through the output unit thereof, that is, within the UI thereof (S1110 to S1140).

As illustrated in FIG. 11, detailed information of the peripheral displayed within the UI of the dockee may include a peripheral identifier (ID) for identifying a peripheral, a device name (Dev Name), a name of a peripheral, a peripheral type (Peri type) indicating a type of a peripheral, a read/write (R/W) mode indicating whether a read/write function is supported, a display function (Display func) indicating whether a peripheral has a display function, a connection type (Conn Type) indicating a connection type between the docking center and a peripheral, and status information (Status) indicating a connection state between a peripheral and other device.

Thereafter, the dockee and the docking center performs an authority request and authority response procedure (S1150), and a docking connection is established (S1160). The authority request and authority response procedure may be referred to step S650a of FIG. 6A.

Hereinafter, detailed situations in which the wireless docking system using Wi-Fi proposed in the present disclosure will be described.

Figure 12:
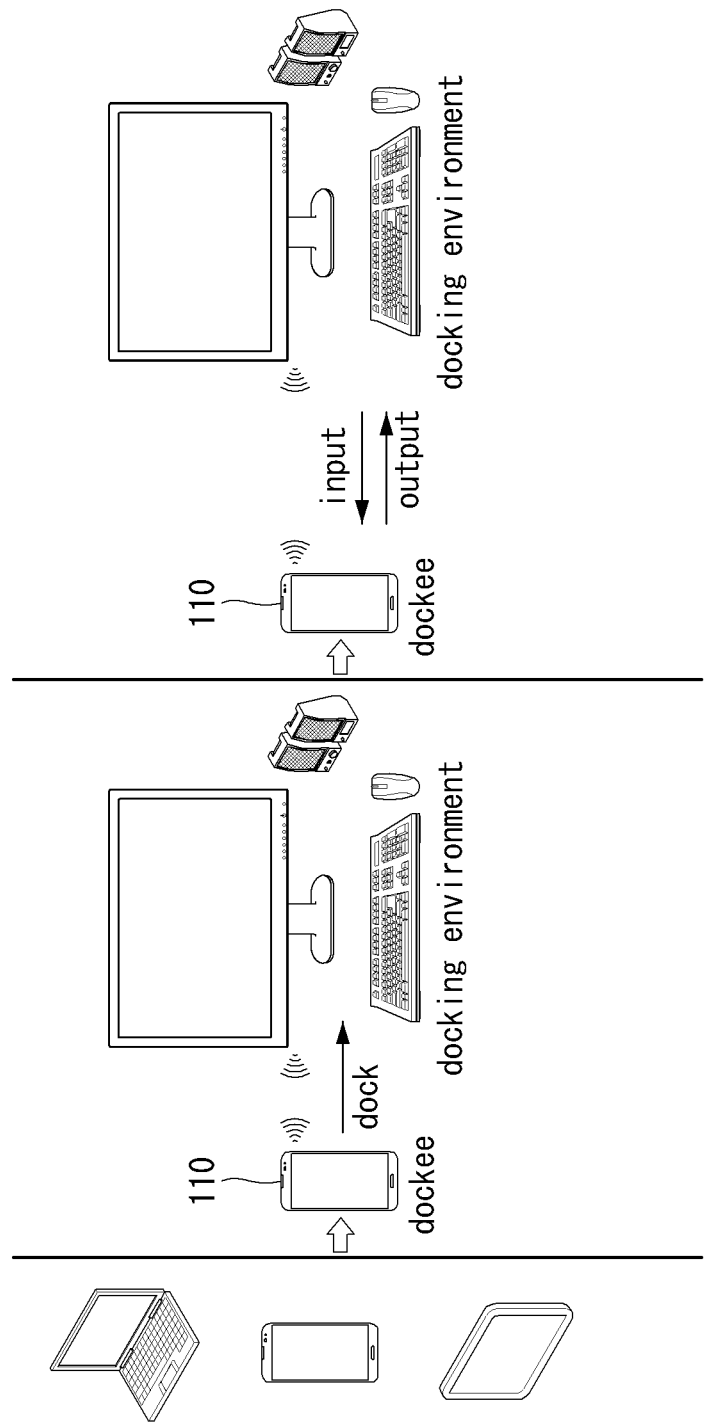
FIG. 12 is a view illustrating an example in which a wireless docking system using Wi-Fi proposed in the present disclosure is utilized in a house or an office.

FIG. 12 is a view illustrating an example in which a wireless docking system using Wi-Fi proposed in the present disclosure is utilized in a house or an office.

In FIG. 12, it is assumed that a portable device (e.g., smartphone) is a dockee (wireless dockee (WD)), a monitor in a house or an office is a docking center (wireless docking center (WDC)), and a keyboard, a mouse, and a speaker are peripherals.

That is, descriptions of the components constituting the wireless docking system of FIG. 12 are illustrated in Table 32 below.

TABLE 32

| | smartphone | monitor | Keyboard/mouse/speaker |
|---|---|---|---|
| Classification of device for each required technique | | | |
| Classification of docking device | WD (dockee) | WDC (docking center) | Peripheral |
| Classification of WSB (Wi-Fi Serial Bus) device | WSB host | WSB hub | WSB Peripheral |
| Classification of Wi-Fi Display device | Display Source | Display Sink | X |

FIG. 12 illustrates a situation in which after a smartphone (dockee) is paired with a monitor (docking center), a function of the smartphone is used by using a keyboard or a mouse (peripheral).

That is, when the dockee accesses the vicinity of the docking environment, the dockee may perform docking with devices within the docking environment.

After docking, the user may use input/output peripherals to interwork with a dockee application. For example, the user may view a screen of the smartphone through the monitor, perform input of the smartphone through the keyboard, listen to a voice of the smartphone through the speaker, and control a screen shift of the smartphone through the mouse.

FIG. 12 is a view illustrating an example in which a wireless docking system using Wi-Fi proposed in the present disclosure is utilized in a house or an office.

Figure 13:
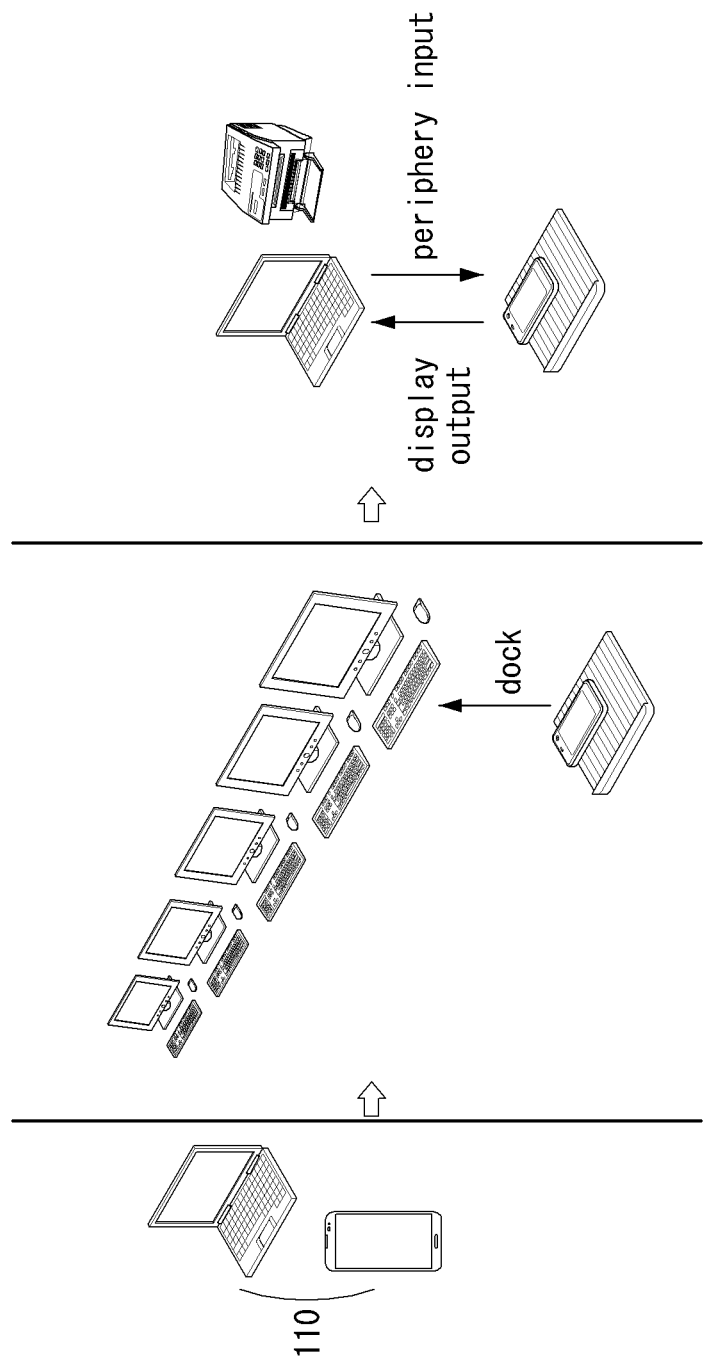
FIG. 13 is a view illustrating an example in which a wireless docking system using Wi-Fi proposed in the present disclosure is utilized in a public place.

FIG. 13 is a view illustrating an example in which a wireless docking system using Wi-Fi proposed in the present disclosure is utilized in a public place.

Here, the public place may be a hotel, an Internet café, a bank, an airplane, or a train.

FIG. 13 illustrates a situation in which one dockee (WD) selects one of a plurality of docking centers (WDCs) and performs a docking service.

As illustrated in FIG. 13, when the dockee (for example, a smartphone) enters a hotspot zone, the dockee performs wireless docking with one of the plurality of docking centers.

Here, wireless docking may be performed as the dockee is placed on a wireless charging pad.

Thereafter, (enhanced) input/output peripherals may be controlled to utilize dockee applications. For example, the user may output specific document files within the dockee by controlling the printer.

Figure 14:
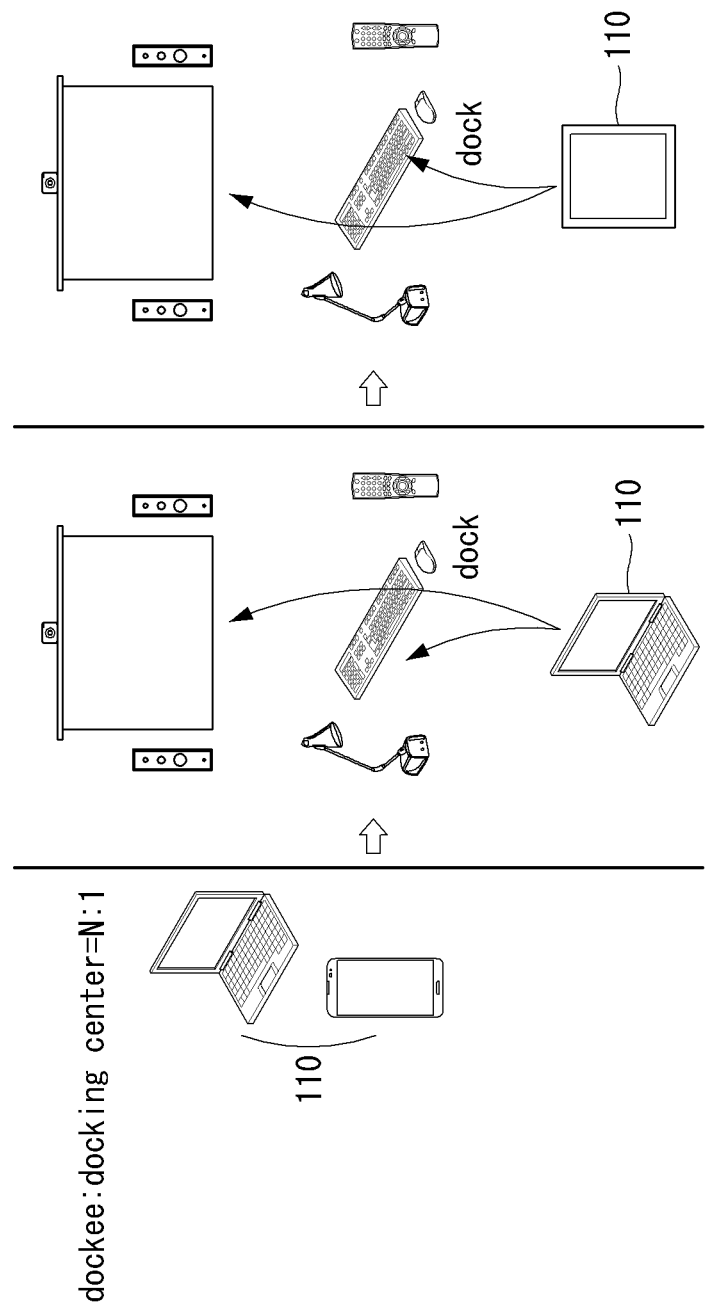
FIG. 14 is a view illustrating another example in which a wireless docking system using Wi-Fi proposed in the present disclosure is utilized.

FIG. 14 is a view illustrating another example in which a wireless docking system using Wi-Fi proposed in the present disclosure is utilized.

FIG. 14 illustrates a situation in which one of a plurality of dockees preoccupies one docking center.

Descriptions and functions of components constituting the wireless docking system of FIG. 14 are as illustrated in Table 33 below.

TABLE 33

| | Smartphone | monitor | keyboard/mouse/speaker |
|---|---|---|---|
| Classification of devices for required techniques | | | |
| Classification of Docking devices | WD (dockee) | WDC (docking center) | Peripheral |

TABLE 33-continued

| Classification of WSB (Wi-Fi Serial Bus) device | WSB host | WSB hub | WSB Peripheral |
|---|---|---|---|
| Classification of Wi-Fi Display device | Display Source | Display Sink | X |

As illustrated in FIG. 14, a plurality of dockees may be present in a meeting room. In this case, only one of the plurality of dockees preoccupies the docking center.

Thereafter, when the use of docking by the dockee which has preoccupied the docking center is terminated, authority to occupy the docking center is switched to another dockee.

For example, a process of switching authority to occupy the docking center to another dockee may be as follows.

When the docking center receives information indicating that the use of docking by the dockee has terminated, from the dockee which has preoccupied the docking center, the docking center may transmit information indicating that the use of the docking center by the dockee which has preoccupied the docking center has terminated and that the docking center is available for docking connection to other dockees in a broadcast or unicast manner.

In a case in which order of a next dockee to be paired with the docking center when the use of docking by the dockee which has preoccupied the docking center terminates has been determined, the docking center may automatically perform pairing with the next dockee.

If a next dockee to be paired with the docking center has not been determined, the docking center may switch authority to occupy the docking center to other dockee in consideration of reception signal strength of a dockee, capacity of a dockee, a distance to a dockee/position of a dockee, and a request order of a dockee to the docking center.

Figure 15:
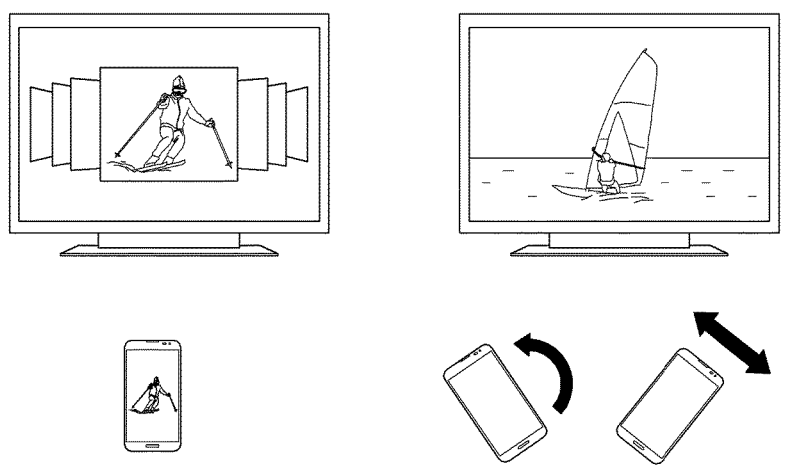
FIG. 15 is a view illustrating a situation in which a dockee directly controls a docking center without using a peripheral in a wireless docking system using Wi-Fi proposed in the present disclosure.

FIG. 15 is a view illustrating a situation in which a dockee directly controls a docking center without using a peripheral in a wireless docking system using Wi-Fi proposed in the present disclosure.

In this case, the dockee needs to have a function of a peripheral, as well as a function of the dockee.

That is, in a case in which both the dockee function and the peripheral function are activated in the dockee, the dockee may directly use the docking service without using a peripheral.

For example, a screen of the dockee may be output to the docking center and the screen output on the docking center may be controlled by using a movement of the dockee.

Indication whether the dockee performs multiple functions may be included in information in a message transmitted and received between the dockee and the docking center.

Hereinafter, a method in which a plurality of dockees are commonly connected to the docking center and preoccupy and share peripherals will be described.

Figure 16:
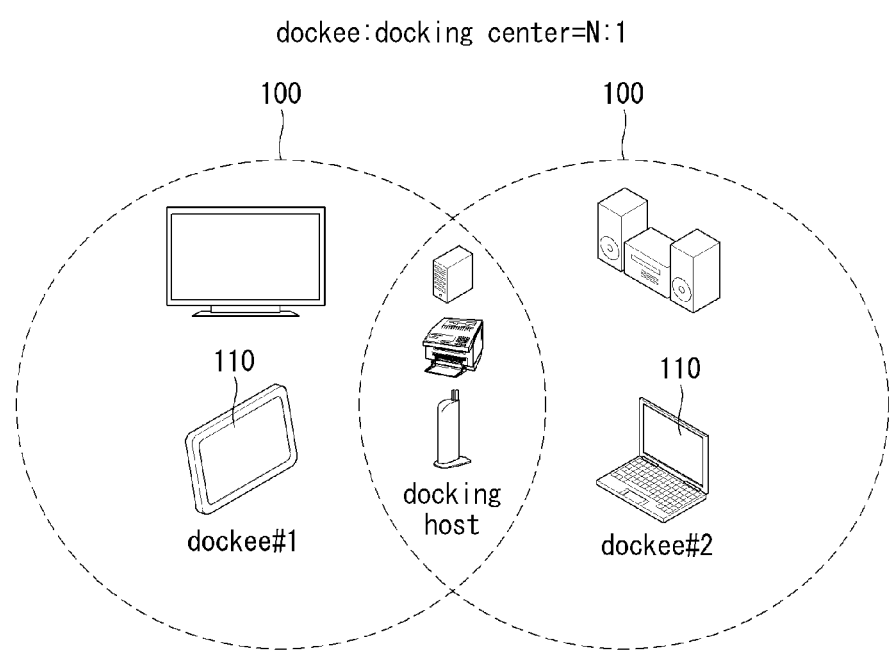
FIG. 16 is a view illustrating a situation in which a plurality of dockees share peripherals in a wireless docking system using Wi-Fi proposed in the present disclosure.

FIG. 16 is a view illustrating a situation in which a plurality of dockees share peripherals in a wireless docking system using Wi-Fi proposed in the present disclosure.

First, the docking center needs to have capability of performing a plurality of docking connections with a plurality of dockees.

That is, the docking center may transmit information indicating whether it is able to performing a plurality of docking connections in a broadcast or unicast manner before performing a docking connection with a dockee. Alternatively, the information indicating whether the docking center is able to perform a plurality of docking connections may be transmitted when the dockee performs a docking connection with the docking center (a docking discovery procedure or a docking pairing procedure).

When the docking center completes a pairing procedure with a plurality of dockees, the docking center transmits peripheral detailed information to each of the dockees.

Here, each of the dockees transmits information of a peripheral desired to be controlled to the docking center.

Thereafter, the docking center sets authority to occupy a peripheral for each dockey, and transmits the set peripheral occupance authority information of each dockee to each dockee.

In a case in which the authority to occupy a peripheral, among the peripherals, is overlapped, the docking center may transfer the overlap authority to occupy of the peripheral to a dockee determined to have priority in consideration of hardware capacity and a request order of dockees.

If the docking center cannot determine to which dockee the authority to occupy is to be transferred with respect to the overlapped authority to occupy the peripheral as requested, the docking center may terminate the sharing procedure with respect to the peripheral for which authority to occupy has been requested to be overlapped.

Hereinafter, another method for supporting the wireless docking service in the Wi-Fi direct (Wi-Fi P2P) will be described.

As described above, the docking protocol is basically a protocol of an application layer and uses TCP/IP-based communication. Thus, in order to support the wireless docking service in the existing Wi-Fi direct (Wi-Fi P2P) network, the dockee (Wi-Fi dockee (WD)) should search for a nearby docking center (Wi-Fi docking (WDC)), perform IP-based communication with every searched Wi-Fi device, and recognize whether a docking service is supported, causing great overhead and a long process time.

Thus, hereinafter, a method in which whether a nearby Wi-Fi device supports docking is first recognized by utilizing a device discovery (find phase) procedure of the Wi-Fi direct (Wi-Fi P2P), and a docking connection is performed only on the selected Wi-Fi device through IP connection will be described.

In detail, in order to recognize whether a docking service is supported in the device discovery procedure of the Wi-Fi direct, the docking discovery procedure is performed by adding a docking IE including simple docking information to a probe request or a probe response frame.

Also, whether a selected dockee is available for connection is recognized in advance through a provision discovery request and provision discovery response (Provision Discovery Req/Rsp), and IP-based joing is performed, whereby overhead caused as joining the docking center is rejected after the completion of every connection establishment procedure is prevented.

Figure 17:
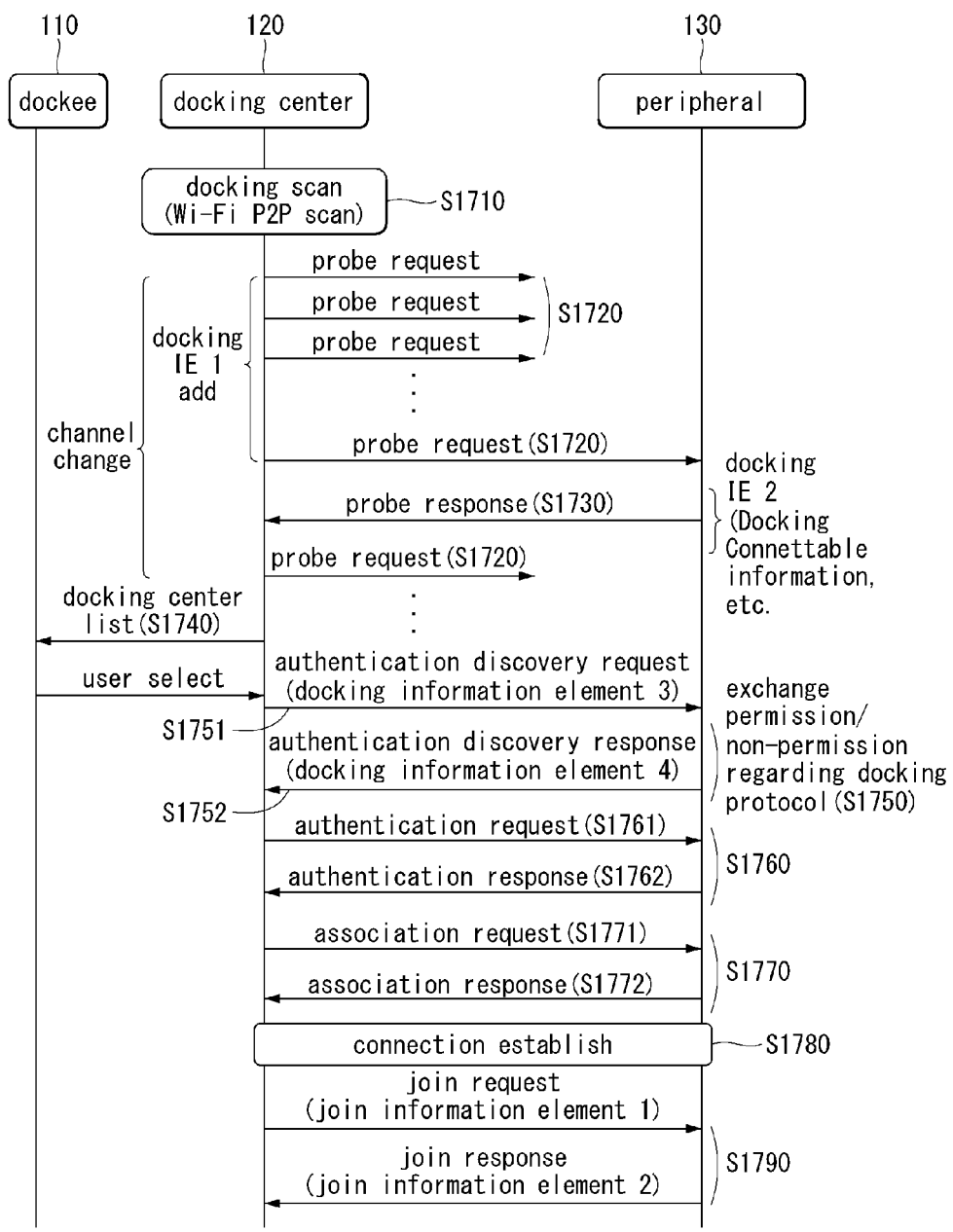
FIG. 17 is a flow chart illustrating an example of a method for supporting a wireless docking service in a Wi-Fi direct network proposed in the present disclosure.

FIG. 17 is a flow chart illustrating an example of a method for supporting a wireless docking service in a Wi-Fi direct network proposed in the present disclosure.

Detailed description related to Wi-Fi direct network may be referred to FIG. 4B described above.

As illustrated in FIG. 17, the dockee scans all of channels first supported for docking (docking scan or Wi-Fi P2P scan) (S1710). The dockee collects information regarding nearby devices or network through the scanning.

Thereafter, in order to recognize every docking center present within an accessible distance, the dockee transmits a probe request frame including docking information element (IE) 1 to the docking center through a social channel (S1720).

Here, the docking IE 1 includes wireless docking related parameters, and the wireless docking related parameters are as illustrated in Table 34 below.

TABLE 34

| Parameter | Description |
| --- | --- |
| Docking Role | Information indicating classification of roles with respect to dockee or docking center |
| Device Name | Name of device |
| Device ID | Unique ID of device |
| Supported Channel List | 2.4 GHz, 5 GHz, 60 GHz |
| Docking information request | Command for docking discovery |

The docking role is information indicating classification of roles with respect to a dockee or a docking center. The device name parameter and the device ID parameter indicate a device name and a unique ID of a device. The supported channel list may include 2.4 GHz, 5 GHz, and 60 GHz. The 2.5 GHz channel is a social channel, and 5 GHz and 60 GHz are operation channels. Also, the docking information request denotes a command for docking discovery.

Thereafter, when the docking center receives the probe request frame from the dockee, the docking center transmits a probe response frame including a docking IE 2 to the dockee (S1730).

The docking IE 2 includes docking connection availability information indicating whether docking connection is available.

The docking IE 2 included in the probe response frame includes the following parameters.

- Method for Connecting WDC: It is a parameter indicating a method for connection to a docking center. When the docking center is connected in an infrastructure form, this parameter provides additional information to allow the dockee to be connected to the network. The additional information may include an SSID, a channel, and a BSSID.
- Capability: It is a parameter indicating capability of the docking center. The capability of the docking center may include a maximum number that can be connected to the dockee, a maximum docking environment, and whether Wi-Fi display is supported.
- Read/write mode (R/W Mode): It is a parameter indicating whether each peripheral is available for read and write.
- Sharable Type: It is a parameter indicating whether a peripheral, such as a printer, or the like, is sharable.
- Peripheral protocol (PFP): It is a parameter indicating existing protocol information used by each peripheral to perform communication with a docking center. The protocol may include WSB (Wi-Fi Serial Bus), USB, and Bluetooth.
- Availability/Reason: It is a parameter indicating whether a peripheral is available to be used through a dockee, and a reason in a case in which the peripheral is not available to be used.
- Docking Role: It is a parameter classifying roles with respect to a dockee or a docking center.
- Device Name/Device ID: It is a parameter indicating a device name and a unique ID of a device.
- Connectable/Non-connectable: When the docking center is a device already connected to another dockee so it is not sharable or the docking center cannot provide a docking service due to other environmental problem, or the like, this parameter explicitly provides corresponding information to the dockee.
- Supported Channel List: it is a parameter indicating a list of channels of a Wi-Fi interface that can be provided, and it includes band information such as 2.4 GHz, 5 GHz, and 60 GHz.
- Current Channel: When the docking center retains another Wi-Fi connection, this parameter indicates the number of channels thereof.
- Connectable Type: It is a parameter indicating a Wi-Fi connection type that can be provided by the docking center to the dockee. It means classification of a Wi-Fi P2P (direct) or an existing infrastructure.
- Number of WDN: It is a parameter indicating the number of wireless docking environments (WDN) that can be provided by the docking center. Here, WDN refers to the entirety or a partial aggregation of peripherals connected to the docking center.
- Power Save Mode: It is the current power save mode pursued by the docking center
- Topology Option: It is a parameter indicating a logical link form in which the docking center is currently connected to an external AP or other device in a Wi-Fi P2P form and a logical link form in which the docking center is currently connected to nearby peripherals. Here, the parameter may also include interface type (USB, WSB, Bluetooth, or Wi-Fi P2P) information of each link.

In a case in which a probe response frame is received from the docking center, a received docking center list is displayed in a UI of the dockee (S1740).

Thereafter, when a docking center is selected by the user, the dockee performs a provision discover (request/response) procedure with the selected docking center (S1750).

The provision discover procedure is a procedure performed optionally in a data link layer in the Wi-Fi P2P procedure.

Whether the docking center is able to perform docking service and is connectable may be recognized in advance through exchanging detailed information between the dockee and the docking center in the data link layer through the provision discover procedure.

That is, the dockee includes docking IE 3 required for performing a docking service in a provision discover request message and transmits the same to the docking center (S1751).

Upon receiving the provision discover request message from the dockee, the docking center transmits a provision discover response message including a result of permission or non-permission of docking connection to perform a docking service to the dockee (S1752).

Here, the information including the result of permission or non-permission of docking connection to perform a docking service is included in a docking IE 4.

Here, when the docking center cannot satisfy the request from the dockee (for example, the docking center cannot support a peripheral function (PF) selected by the dockee or when the docking center cannot provide a WDN selected by the dockee), the docking center sets a value of a result field regarding the joining of the docking IE 4 included in the provision discover response frame, as negative, and transmits the same to the dockee.

The docking protocol proposed in the present disclosure is basically performed in the IP-based application layer. However, in order to complete the corresponding IP establishment, a process of GO negotiation in the Wi-Fi P2P procedure and a process such as beaconing, authentication, or association in an operation channel should be performed in advance, and thereafter, a great amount of time and procedures are required until when IP setting is completed through a DHCP, or the like.

After the large amount of procedures are performed, a joining procedure may be attempted in an IP-based docking protocol process, and here, the WDC cannot accept a join request of the corresponding WD due to dissatisfaction of certain requirements, the WD should be returned to the link layer, select a different WDC, and perform again the large amount of procedures as described above again, causing overhead.

Table 35 below illustrates an example of the docking IE 3 included in the provision discover request frame.

TABLE 35

| | |
|---|---|
| Docking Role (WD)/ID | Classification of role as dockee or docking center (dockee is indicated) |
| Selected WDN to use | WDN selected to be used (by user) |
| Selected Individual PF to use | Each peripheral selected to be used |
| Current Channel | The number of channels when docking center retains other Wi-Fi connection |
| Connectable Type (P2P/Infra) | It indicates Wi-Fi Connection Type that can be provided by docking center to dockee, Classification of Wi-Fi P2P (Direct) or existing infrastructure. |

Table 36 below illustrates an example of a docking IE 4 included in the provision discover response frame.

TABLE 36

| | |
|---|---|
| Docking Role (WDC)/ID | Classification of role as dockee or docking center (docking center is indicated) |
| Result for joining | It indicates result of permission or non-permission of connection with respect to joining request |
| Reason (if Denied) | Deny for using selected WDN Deny for using selected PF |
| Current Channel | The number of channels when docking center retains other Wi-Fi connection |
| Connectable Type (P2P/Infra) | It indicates Wi-Fi Connection Type that can be provided by docking center to dockee, Classification of Wi-Fi P2P (Direct) or existing infrastructure. |
| Docking Protocol Info | TCP/UDP Port |

Thereafter, the dockee performs a docking connection establishment through an authentication procedure and an association procedure with the docking center (S1760 and S1770).

Here, the authentication procedure is performed as the dockee transmits an authentication request to the docking center (S1761) and the dockee center transmits an authentication response to the dockee, in response to the authentication request (S1762).

Also, the association procedure is performed as the dockee transmits an association request to the docking center (S1771) and the docking center transmits an association response to the dockee, in response to the association request (S1772).

Thereafter, the dockee and the docking center establish a connection enabling IP-based communication through a joining procedure (S1780).

Here, the joining procedure is performed as the dockee transmits a join request to the docking center (S1791) and the docking center transmits a join response to the dockee, in response to the join request (S1792).

The joining procedure is performed only with the dockee which has received the result of "connection permitted" from the docking center through the provision discover procedure.

Also, the joining procedure is dependent on an IP-based docking protocol, which is a procedure for the dockee to check a final connection by exchanging additional information required for docking connection after performing a Wi-Fi P2P connection and an IP connection process with docking center already permitted for connection.

After completion of the joining procedure, it is regarded that docking between the dockee and the docking center is completed and a service required for docking is performed.

The join request frame includes parameters as follows. Here, the join request may be transmitted in the form of a message, a primitive, or signaling.

Docking Role (WD)/ID: A docking role parameter classifies a role of a dockee and a docking center, and the docking ID parameter denotes an ID of a dockee requesting docking.

Selected WDN to use: It is a parameter indicating a wireless docking environment, which further includes read/write mode (RW_mode) of each peripheral of a WDN and authority type parameter.

Here, the authority type parameter indicates information for preoccupying or sharing a peripheral dependent on the docking center.

For example, when the authority type parameter has a "preemption" value, the parameter includes a list of preemption available peripherals (for example, a mouse, a keyboard, an ODD, a display, a speaker, and a microphone).

Also, when the authority type parameter has a "share" value, the parameter includes a list of sharable peripherals (a printer or a scanner).

Selected Individual PF to use: It is a parameter indicating information regarding each peripheral selected to be used, and further includes an RW_mode and Authority Type parameter regarding each peripheral.

Display Func: It refers to a parameter indicating whether a display function is supported.

Also, the join response frame includes the following parameters.

Docking Role (WDC)/ID: The docking role parameter classifies a role of a dockee or a docking center, and the ID parameter indicates an ID of a docking center permitting docking.

Result for joining: It is a parameter indicating a result of permission or non-permission regarding a requested docking join.

Reason (if Denied): It is a parameter indicating a reason of impossibility of docking join when docking join is impossible. It may include impossibility regarding the use of selected WDN and impossibility regarding the use of a selected PF.

Connectable Type (P2P/Infra): It indicates a type of docking connection, namely, indicates whether a type of docking connection is a Wi-Fi P2P connection or an infrastructure connection.

Wi-Fi Display Connection Info: It indicates Wi-Fi display connection information, which includes connection port information.

Hereinafter, a method for exchanging a message between devices (dockee and docking center) when a command, setting, or information exchange is required while a wireless docking service is being performed between the devices (dockee and docking center) in a Wi-Fi Direct system will be described.

Here, the message exchange is performed in the form of a command and response message.

The message exchange procedure is used in a situation in which decision making is required through consultation between the dockee and the docking center, and a response message includes a positive or negative result or requested information with respect to a request proposed in a command message.

The message exchange procedure may be requested by both the dockee and the docking center, and a requested device should necessarily transmit a response to a requesting device.

Also, the message exchange procedure is generated while a docking connection is established between the dockee and the docking center and a docking operation is being performed. Here, processes before the establishment of the docking connection are omitted for the purpose of description, and the above descriptions and drawings will be referred as necessary.

Figure 18A:
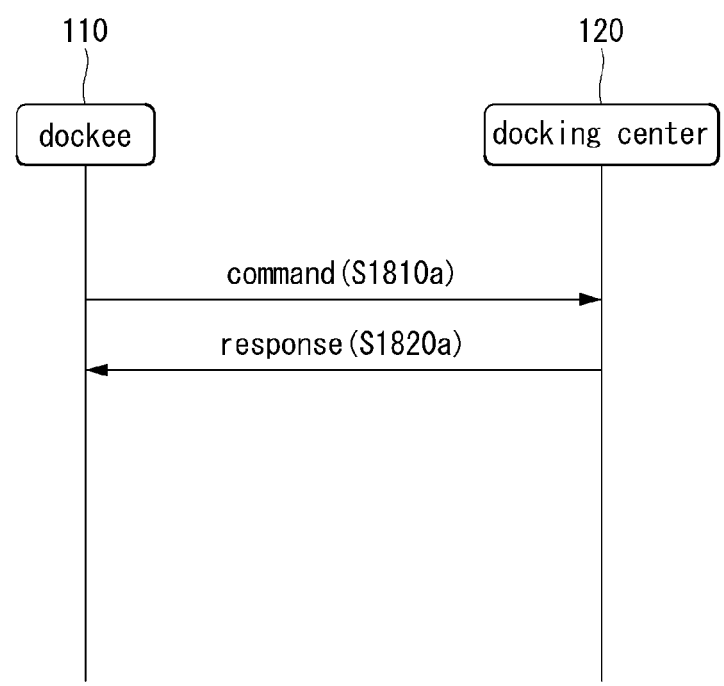
FIG. 18A is a view illustrating a message exchange procedure according to a request from a dockee.
Figure 18B:
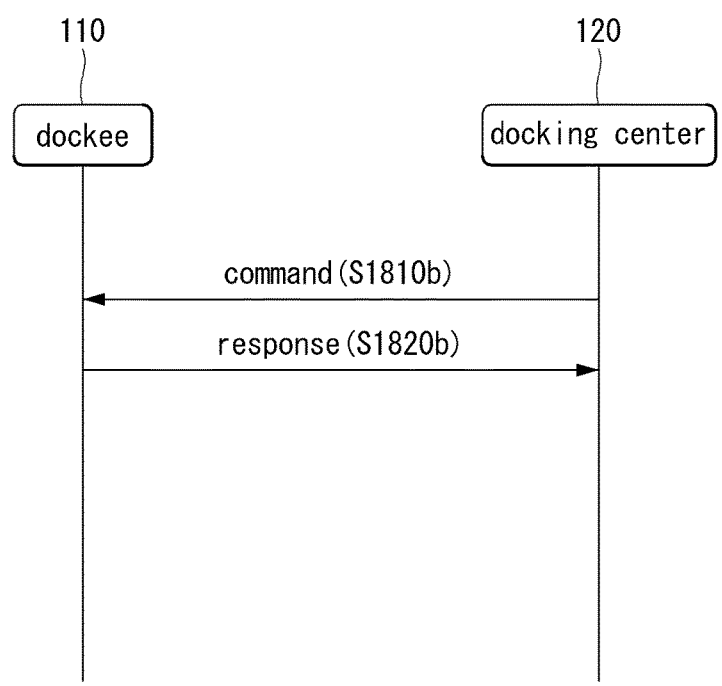
FIG. 18B is a view illustrating a message exchange procedure according to a request from a docking center.

FIG. 18A is a view illustrating a message exchange procedure according to a request from a dockee, and FIG. 18B is a view illustrating a message exchange procedure according to a request from a docking center.

Referring to FIG. 18A, when a command, setting, or information exchange is required over the docking center, the dockee transmits a set command message to the docking center (S1810a).

The set command message includes the following parameters.

Power Save Mode: It is the current power save mode pursued by the docking center, which indicates a level value or a predefined power save stage.

Additional WDN Selection: It indicates additional WDN selection.

Release WDN: It indicates release of connection to WDN.

Additional PF Selection: It indicates an additional PF selection.

Release PF: It indicates release of connection to PF.

Disconnect Request: It indicates a connection release request.

Get WDC Info: It indicates securing of WDC information.

Set WDC Info: It indicates setting of WDC information

Get WDN Info: It indicates securing of WDN information

Set WDN Info: It indicates setting of WDN information

Get Specific Peri Info: It indicates securing of specific peripheral information Set Specific Peri Info: It indicates setting of specific peripheral information Thereafter, the docking center transmits a response message to the dockee, in response to the set command message (S1820).

Referring to FIG. 18B, when a command, setting, or information exchange is required over the docking center, the dockee transmits a set command message to the docking center (S1810b).

The set command message transmitted by the docking center includes the following parameters.

Power Save Mode: It is the current power save mode pursued by the docking center, which indicates a level value or a predefined power save stage.

Operation Channel Change: It is a parameter indicating changing of a docking connection operation channel.

Disconnect Request: It is a parameter indicating a connection release request.

Thereafter, the dockee transmits a response with respect to the set command message to the docking center (S1820b).

The command and response message of FIGS. 18A and 18B may be exchanged according to a periodic exchange scheme, an event-driven exchange scheme, or a mixture scheme.

For example, the periodic state information exchange uses a periodic exchange scheme, and other information exchange based on necessity uses an event-driven exchange scheme.

Also, in a case in which a response message with respect to the command message is not received within a predetermined time, the command message is retransmitted when a predetermined period of time terminates.

Hereinafter, a method for informing a counterpart about occurrence of an event when a specific event occurs, or a method for unilaterally delivering a specific command to a counterpart will be described.

Here, unlike a command and response message exchange, a negotiation between two devices is not necessary, and thus, there is not response, and in order to guarantee transmission reliability of a notification message, only an Ack response exists.

The purpose of Ack transmission is guaranteeing reliability regarding notification transmission, and as discussed above, when an Ack is not received from a counterpart for a predetermined period of time after transmission of a notification message, the notification message is retransmitted. Similarly, the procedure may also be performed by the dockee or the docking center.

Figure 19A:
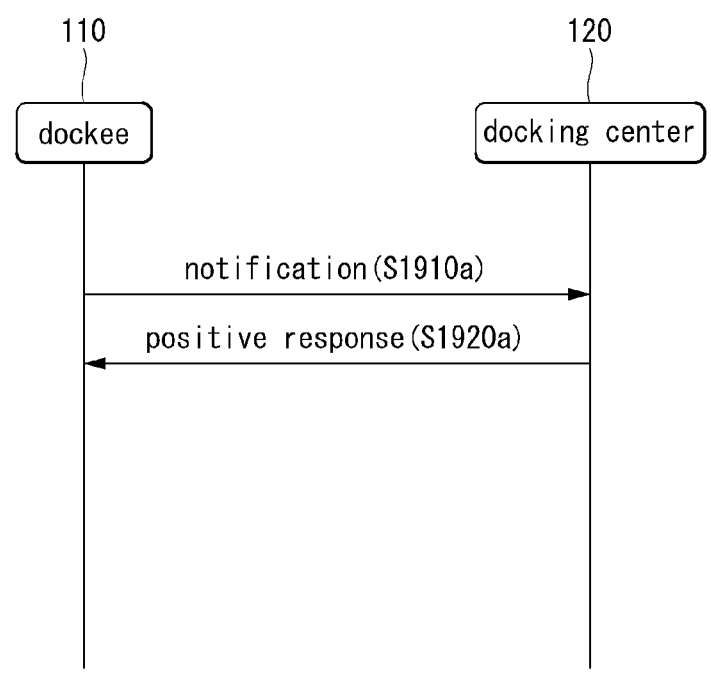
FIG. 19A is a view illustrating a method for notifying a docking center about an event occurring in a dockee.
Figure 19B:
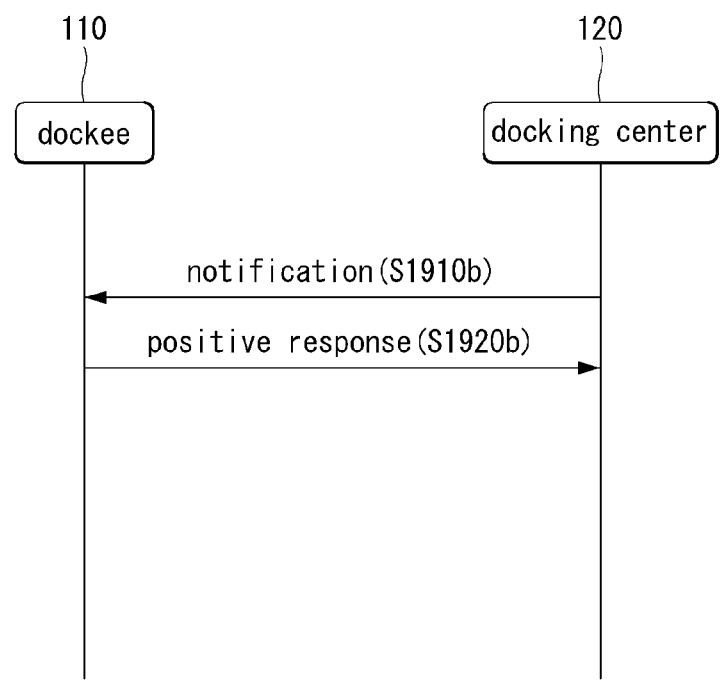
FIG. 19B is a view illustrating a method for notifying a dockee about an event occurring in a docking center.

FIG. 19A is a view illustrating a method for notifying a docking center about an event occurring in a dockee, and FIG. 19B is a view illustrating a method for notifying a dockee about an event occurring in a docking center.

First, referring to FIG. 19A, when an event occurs, the dockee transmits a notification or a notification message to the decking center in order to inform about the occurrence of the event (S1910a).

Here, when the event may occur due to a change in a status such as a change in a parameter by the user or according to external controlling.

The notification message may include the following parameters.

Docking Role (WD): The docking role parameter is a parameter indicating a role of the dockee or the docking center. Here, the role of the dockee is indicated.

Parameter Changed: It is a parameter indicating a change in a parameter such as transmission Thereafter, the docking center transmits ACK to the dockee as a response to the received notification message (S1920a).

Referring to FIG. 19B, when an event occurs, the docking center transmits a notification message to the dockee in order to inform about the generated event (S1910b).

Here, the event generated in the docking center may be a parameter change command of the dockee. Also, when status information of the docking center and a WDN (including individual PF) dependent on the docking center is changed, the notification message may be transmitted to the dockee in order to inform the dockee about the event.

The notification message includes the following parameter.

Docking Role (WDC): It is a parameter indicating a role of the dockee or the docking center. Here, the role of the docking center is indicated.

Change Parameter: It indicates a parameter change and may indicate a change in transmission power and an operation channel.

WDN Event: It is a parameter indicating a change in WDN usability

Specific PF Event: It is a parameter indicating a change in usability of PF (Peripheral).

Thereafter, the dockee transmits ACK to the docking center, as a response to the notification message (S1920b).

Although respective drawings are divisionally described for convenience of description, the embodiments described in the respective drawings may be designed so as to be combined to implement a new embodiment. When necessary, design of a recording medium readable by a computer in which a program to execute the above-described embodiments is recorded may fall within the scope of the appended claims and their equivalents.

As for the method for providing a wireless docking service according to the present disclosure, the configuration and method according to the embodiments of the present disclosure described above are not limited in its application, but the entirety or a portion of the embodiments may be selectively combined to be configured into various modifications.

In the embodiments of the present invention, the method for providing a wireless docking service according to the present disclosure may be implemented as codes that can be read by a processor provided in a network device in a recording medium. The processor-readable recording medium may include any type of recording devices in which data that can be read by the processor is stored. The processor-readable recording medium may include a ROM, a RAM, a CD-ROM, a magnetic tape, a floppy disk, an optical data storage device, and the like. The processor-readable medium also includes implementations in the form of carrier waves or signals, e.g., transmission via the Internet. The processor-readable recording medium may be distributed over network-coupled computer systems so that the processor-readable code may be stored and executed in a distributed fashion.

Specific exemplary embodiments have been described. However, the present disclosure is not limited to the specific exemplary embodiments and various modifications may be made without departing from the scope of the present invention claimed in the claims, and such modifications should not be individually understood from technical concepts or prospects of the present disclosure.

Further, although the disclosure has described both product inventions and process inventions, description of both inventions may be complementarily applied as needed.

While the present invention has been shown and described in connection with the embodiments, it will be apparent to those skilled in the art that modifications and variations can be made without departing from the spirit and scope of the invention as defined by the appended claims.

INDUSTRIAL APPLICABILITY

The present disclosure relates to a docking system and, in particular, uses a wireless docking service in a home network environment.

The invention claimed is:

1. A method for performing a docking service using Wi-Fi, the method performed by a wireless dockee (WD) comprising:
    transmitting a probe request frame for discovering the docking service to a wireless docking center (WDC), the probe request including a docking information element (IE) 1, the docking IE 1 including at least one of:
        a device Identifier parameter for identifying a device; and
        a docking information request parameter indicating related to a docking service discovery;
    receiving a probe response frame including a docking IE 2 from the WDC, the docking IE 2 including at least one of:
        a device name parameter indicating a name of a device;
        a wireless docking environment (WDN) parameter indicating information related to WDN that can be provided by the WDC; and
        a WDN default parameter indicating information related to one or more peripherals within each WDN; and
    determining a WDC for performing a docking connection based on the received docking IE 2; and
    performing an Internet protocol (IP)-based docking connection with the determined WDC.

2. The method of claim 1, wherein the docking IE 2 includes at least one of:
    a docking role parameter indicating a role as a WD or a WDC;
    a device identifier parameter for identifying a device; and
    a parameter indicating whether a docking connection to a WDC is available.

3. The method of claim 1, wherein the performing the docking connection comprises:
    transmitting a provision discovery request including docking IE 3 comprising information required for performing the docking service to the WDC; and
    receiving, from the WDC, a provision discovery response including a docking IE 4 comprising result information for the provision discovery request.

4. The method of claim 3, wherein the docking IE 3 includes at least one of:
    a docking role parameter indicating a role as a WD or a WDC;
    a parameter indicating a selected WDN; and
    a parameter indicating each peripheral to be selected within the selected WDN.

5. The method of claim 3, wherein the docking IE 4 includes at least one of:
    a docking role parameter indicating a role as a WD or a WDC;
    a parameter indicating a Wi-Fi connection type that can be provided to the WD; and
    a parameter indicating docking connection protocol information.

6. The method of claim 3, further comprising:
transmitting a join request for requesting additional information required for performing the docking service; and
receiving a join response as a response to the join request from the WDC.

7. The method of claim 6, wherein the join response includes at least one of:
a docking role parameter indicating a role as a WD or a WDC; and
a parameter indicating Wi-Fi display connection information.

8. The method of claim 6, further comprising:
transmitting a command message to the WDC; and
receiving a response message with respect to the command message from the WDC.

9. The method of claim 8, wherein the command message includes at least one of:
a parameter indicating a request for selecting an additional WDN;
a parameter indicating a request for releasing a connection to a WDN;
a parameter indicating a request for selecting an additional peripheral;
a parameter indicating a request for releasing a connection with a peripheral;
a parameter indicating a request for releasing a docking connection;
a parameter indicating a request for acquiring information related to a WDN; and
a parameter indicating a request for acquiring information related to a specific peripheral.

10. The method of claim 6, further comprising:
receiving a command message from the WDC; and
transmitting a response message with respect to the command message to the WDC.

11. The method of claim 6, further comprising receiving an event notification message indicating occurrence of an event from the WDC.

12. A device for performing a docking service using Wi-Fi, the device comprising:
an antenna configured to transmit and receive a radio signal with a wireless docking center (WDC); and
a processor configured to:
control the antenna to transmit a probe request frame for discovering the docking service to the WDC, the probe request frame including a docking information element (IE) 1, the docking IE 1 including at least one of:
a device Identifier parameter for identifying a device; and
a docking information request parameter indicating information related to a docking service discovery;
control the antenna to receive a probe response frame including a docking IE 2 from the WDC, the docking IE 2 including at least one of:
a device name parameter indicating a name of a device;
a wireless docking environment (WDN) parameter indicating information related to WDN that can be provided by the WDC; and
a WDN default parameter indicating information related to one or more peripherals within each WDN;
determine a WDC for performing a docking connection based on the received docking IE 2; and
perform an Internet protocol (IP)-based docking connection with the determined WDC.

* * * * *